(12) United States Patent
Ishida et al.

(10) Patent No.: US 6,481,524 B1
(45) Date of Patent: Nov. 19, 2002

(54) VEHICLE EQUIPPED WITH TURNING MECHANISM

(75) Inventors: Yoshimitsu Ishida; Tadashi Hanaoka, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/635,477

(22) Filed: Aug. 8, 2000

(30) Foreign Application Priority Data

Aug. 10, 1999 (JP) .......................................... 11-226904
Aug. 10, 1999 (JP) .......................................... 11-226905

(51) Int. Cl.$^7$ ...................... B60K 17/348; B60K 17/354
(52) U.S. Cl. ....................................... 180/252; 180/253
(58) Field of Search .............................. 180/252–255, 180/408, 410, 411, 414, 234, 236, 238, 199, 202

(56) References Cited

U.S. PATENT DOCUMENTS

| | | | | |
|---|---|---|---|---|
| 1,172,866 A | * | 2/1916 | Blevins | |
| 2,910,131 A | * | 10/1959 | Krotz | 180/45 |
| 3,596,730 A | * | 8/1971 | Cecce | 180/79.2 R |
| 4,353,284 A | * | 10/1982 | Billottet et al. | 89/40 B |
| 4,971,175 A | * | 11/1990 | Hamada et al. | 180/140 |
| 5,090,512 A | * | 2/1992 | Mullet et al. | 180/236 |
| 5,186,273 A | * | 2/1993 | Mori | 180/140 |
| 5,208,751 A | * | 5/1993 | Berkefeld | 364/424.05 |
| 5,337,850 A | * | 8/1994 | Mouri et al. | 180/140 |
| 5,570,754 A | * | 11/1996 | Stimson | 180/234 |

* cited by examiner

Primary Examiner—Anne Marie Boehler
Assistant Examiner—Tony Winner
(74) Attorney, Agent, or Firm—Armstrong, Westerman & Hattori, LLP.

(57) ABSTRACT

A four-wheel vehicle capable of permitting a driver to perform a turning operation with a good operability. One of front and rear pairs of left and right wheels, to which a running torque produced by a driving source is not transmitted, are rotated on respective axes perpendicular to the ground. The one pair of left and right wheels are rotated from straight traveling positions taken when the vehicle is running to angular positions along tangential directions of an arc passing the axes perpendicular to the ground on a neighborhood of a center point of a rotating axle for running the vehicle of the other of front and rear pairs of left and right wheels. As a left or right turn instruction is generated in response to a manipulation, motors are applied with a gradually increasing driving voltage, such that the motors apply rotating torques to the one pair of left and right wheels to turn the vehicle body on the neighborhood of the center point of rotating axles for running the vehicle of the other pairs of left and right wheels.

28 Claims, 22 Drawing Sheets

VEHICLE EQUIPPED WITH TURNING MECHANISM

BACKGROUND OF THE INVENTION

1. Field of the Invention

The present invention relates to a vehicle which can turn with a smaller turning radius.

2. Description of the Related Background Art

For four-wheel vehicles, a parameter called the "turning radius" is known for indicating the performance of each four-wheel vehicle. A vehicle having a smaller turning radius can make a smaller turn at a corner during a turning operation such as U-turn.

Vehicles employing four-wheel steering (4WS) have been known as prior art four-wheel vehicles which can improve the turning radius. The 4WS refers to a system which controls the steering angle (rudder angle) of not only front wheels but also rear wheels in association with a manipulation through a steering wheel. The 4WS system can reduce the turning radius due to the controllable steering angle provided to the rear wheels.

A fifth wheel system is also known as an improvement in the turning radius. The fifth wheel system additionally has a fifth wheel stored below the floor, in addition to four wheels, such that the fifth wheel is slightly protruded relative to the other wheels during a turn to lift up the vehicle body, and the fifth wheel is driven to have the vehicle make a turn.

However, the 4WS, while it is effective in reducing the turning radius, suffers from limitations to the reduction in the turning radius since the steering angle is limited in order to suppress an inherent shake-out phenomenon to a practically ignorable extent. The fifth wheel system in turn is expected to provide significant effects, but implies a problem that the vehicle becomes unstable due to a three-wheel state during a turning operation.

Moreover, since a vehicle turning operation which reduces the turning radius requires actuation of a turning mechanism which cannot be used during a normal running operation such as straight traveling and backward traveling, the vehicle presents another problem that it has only limited operation states in which the vehicle can be turned with stability.

Conventional vehicles also have a problem that drivers encounter difficulties in performing a turning operation with a good operability.

SUMMARY OF THE INVENTION

It is therefore an object of the present invention to provide a four-wheel vehicle which is capable of stably turning the vehicle body with a relatively small turning radius. It is another object of the present invention to provide a four-wheel vehicle which is capable of permitting a driver to perform a turning operation with a good operability.

A four-wheel vehicle equipped with a turning mechanism according to the present invention comprises a rotatably supporting device for supporting one of front and rear pairs of left and right wheels, to which a running torque produced by a driving source is not transmitted, for rotation concerning respective axes perpendicular to the ground; an instructing device for generating a turn mode instruction in response to a manipulation; a determining device for determining whether a vehicle operating state satisfies predetermined conditions when the turn mode instruction is generated; a rotation driving device, when the determining device determines that the predetermined conditions are satisfied, for rotating the one pair of left and right wheels from straight traveling positions taken when the vehicle is running to respective angular positions along tangential directions of an arc passing the respective axes perpendicular to the ground of the one pair of left and right wheels, with the center located near a center point of a rotating axle for running the vehicle of the other of the front and rear pairs of left and right wheels; and turn driving device for applying a rotating torque to the one pair of left and right wheels at the angular positions along the tangential directions to turn the vehicle body on a neighborhood of the center point of the rotating axle for running the vehicle of the other pair of left and right wheels.

According to the four-wheel vehicle of the present invention described above, since one of front and rear pairs of left and right wheels, to which a running torque produced by a driving source is not transmitted, are supported for rotation concerning the respective axes perpendicular to the ground, and the one pair of left and right wheels are rotated from the straight traveling positions taken when the vehicle is running to the respective angular positions along the tangential directions of the arc passing the respective axes perpendicular to the ground of the one pair of left and right wheels, with the center of the arc located near the center point of the rotating axle for running the vehicle of the other of the front and rear pairs of left and right wheels, it is possible to provide a relatively simple and small turning mechanism. In addition, since the one pair of left and right wheels will not be rotated from the straight traveling positions taken when the vehicle is running to the respective angular positions along the tangential directions for a turning operation unless the vehicle operating state satisfies the predetermined conditions suitable for a turn when a turn mode instruction is generated, the turning operation can be performed while the vehicle is in a stable state. Further, since the one pair of left and right wheels are applied with a rotating torque at angular positions along tangential directions to turn the vehicle body on a neighborhood of the center point of the rotating axle for running the vehicle of the other pair of left and right wheels, the turning radius is extremely small.

The four-wheel vehicle includes a left turn instructing device for generating a left turn instruction in response to a manipulation, and a right turn instructing device for generating a right turn instruction in response to a manipulation, wherein the turn driving device turns the vehicle body counterclockwise in response to the left turn instruction, and turns the vehicle body clockwise in response to the right turn instruction. According to this configuration, the vehicle body can be turned either in the clockwise or counterclockwise direction with a simple manipulation.

The left turn instructing device and the right turn instructing device are arranged integral with a steering wheel. According to this configuration, the driver can readily perform a left turn or a right turn operation while holding the steering wheel.

The four-wheel vehicle comprises a transmission formed with a left turn shift position and a right turn shift position in addition to shift positions for transmission, wherein the left turn instructing device generates the left turn instruction when a shift lever of the transmission is moved to the left turn shift position, and the right turn instructing device generates the right turn instruction when the shift lever of the transmission is moved to the right turn shift position. According to this configuration, the driver can readily perform a left turn or a right turn operation by manipulating the shift lever of the transmission.

The instructing device generates a turn mode stop instruction in response to a manipulation, and the rotation driving device rotates the one pair of left and right wheels from the angular position along the tangential directions to the straight traveling positions in response to the turn mode stop instruction. According to this configuration, after the vehicle body is turned, the one pair of left and right wheels can be rotated to the original straight traveling positions by a manipulation of the driver.

The predetermined conditions include at least the following conditions:

(a) the vehicle stops running; and (b) the steering angle of front wheels is substantially zero degrees. By thus defining the predetermined conditions, it is possible to confirm whether vehicle is in a state from which the vehicle can transition without any problem to a vehicle body turning operation for which the one pair of left and right wheels are driven to rotate.

The condition defining that the vehicle stops running is detected from a shift position of a transmission equipped in the vehicle lying in a P (parking) position or an N (neutral) position, or a side brake being in operation. According to this detecting feature, it is possible to detect that the vehicle is not merely temporarily stopped, thereby preventing the vehicle from running forward or backward during a turning operation.

The turn driving device stops turning the vehicle body when the left turn instruction and the right turn instruction are being simultaneously generated. According to this configuration, it is possible to selectively instruct to turn the vehicle counterclockwise, to turn the vehicle clockwise, and to stop turning the vehicle only by manipulating the left turn instructing device and the right turn instructing device.

The rotation driving device includes a turn position detecting device for detecting that the one pair of left and right wheels have been rotated from the straight traveling positions to the angular positions along the tangential directions to generate a turn position signal, and the rotation driving device stops rotating the one pair of left and right wheels in response to the turn position signal. According to this configuration, since the driving of the one pair of left and right wheels for rotation are immediately stopped when the one pair of left and right wheels have been driven to rotate to the angular positions for turning the vehicle, the driver can proceed to a vehicle body turning operation.

The rotation driving device includes a straight traveling position detecting device for detecting that the one pair of left and right wheels have been rotated from the angular positions along the tangential directions to the straight traveling positions to generate a straight traveling position signal, and the rotation driving device stops rotating the one pair of left and right wheels in response to the straight traveling position signal. According to this configuration, since the driving of the one pair of left and right wheels for rotation are immediately stopped when the one pair of left and right wheels have been driven to rotate to the original straight traveling positions for stopping the vehicle body turning operation, the driver can return to a normal operation.

The vehicle further comprises a shift lock mechanism for disabling the transmission to perform a shifting operation when at least the one pair of left and right wheels are at positions other than the straight traveling positions. According to this configuration, since the vehicle is disabled to travel straight by the shift lock mechanism when the one pair of left and right wheels are at the angular positions rotated from the straight traveling positions for turning the vehicle body, it is possible to prevent erroneous manipulations by the driver.

The turn driving device applies the rotating torque to the one pair of left and right wheels with a driving source different from the driving source to turn the vehicle body. According to this configuration, unlike a normal driving source for running, a driving source capable of producing a minimally required driving force is sufficient, so that a smaller driving source can be driven for the turning operation in order to save the space.

The rotatably supporting device includes a trailing arm for rotatably supporting the one pair of left and right wheels through knuckles at the respective axes perpendicular to the ground of the one pair of left and right wheels. According to this configuration, since the rotatably supporting device is formed of existing suspension members, neither dedicated parts nor members are required for use in implementing the rotatably supporting device, thereby making it possible to reduce the cost.

The turn driving device includes a braking device for applying a braking force to rotations of the one pair of left and right wheels in response to a manipulation on a switch arranged in the steering wheel. According to this configuration, the driver can stop turning the vehicle body by manipulating the switch while holding the steering wheel.

The turn driving device includes a braking device for applying a braking force to rotations of the one pair of left and right wheels in response to stepping on a brake pedal. With this configuration, the driver can stop turning the vehicle body by stepping on the brake pedal in a manner similar to in a normal operation, thereby making it possible to readily stop turning the vehicle body at a desired position.

A four-wheel vehicle equipped with a turning mechanism according to the present invention comprises a rotatably supporting device for supporting one of front and rear pairs of left and right wheels, to which a running torque produced by a driving source is not transmitted, for rotation concerning respective axes perpendicular to the ground; an instructing device for generating a turn mode instruction in response to a manipulation; a determining device for determining whether a vehicle operating state satisfies predetermined conditions when the turn mode instruction is generated; a rotation driving device, when the determining device determines that the predetermined conditions are satisfied, for rotating the one pair of left and right wheels from straight traveling positions taken when the vehicle is running to respective angular positions along tangential directions of an arc passing the respective axes perpendicular to the ground of the one pair of left and right wheels, with the center located near a center point of a rotating axle for running the vehicle of the other of the front and rear pairs of left and right wheels; and a turn driving device for applying rotating torques in rotating directions different from each other to the other pair of left and right wheels at angular positions along tangential directions to turn the vehicle body on a neighborhood of the center point of the rotating axle for running the vehicle of the other pair of left and right wheels.

According to the four-wheel vehicle of the present invention described above, since one of front and rear pairs of left and right wheels, to which a running torque produced by a driving source is not transmitted, are supported for rotation concerning the respective axes perpendicular to the ground, and the one pair of left and right wheels are rotated from the straight traveling positions taken when the vehicle is running to the respective angular positions along the tangential directions of the arc passing the respective axes perpendicular to the ground of the one pair of left and right wheels, with the center of the arc located near the center point of the rotating axle for running the vehicle of the other of the front and rear pairs of left and right wheels, it is possible to provide a relatively simple and small turning mechanism. In addition, since the one pair of left and right wheels will not be rotated from the straight traveling positions taken when the vehicle is running to the respective angular positions along the tangential directions for a turning operation unless the vehicle operating state satisfies the predetermined conditions suitable for a turn when a turn mode instruction is generated, the turning operation can be performed while the vehicle is in a stable state. Further, since the other pair of left and right wheels are applied with rotating torques at angular positions along tangential directions to turn the vehicle body on a neighborhood of the center point of the rotating axle for running the vehicle of the other pair of left and right wheels, the turning radius is extremely small.

The turn driving device applies the rotating torques in rotating directions different from each other to the respective left and right wheels of the other pair with a driving source different from the driving source to turn the vehicle body. According to this configuration, like the aforementioned case, a driving source capable of producing a minimally required driving force is sufficient, unlike a normal driving source for running, so that a smaller driving source can be used to drive the wheels to rotate for the turning operation in order to save the space.

The turn driving device further includes a device for fixing a case for rotatably supporting two pinions arranged in a differential during a turning operation of the vehicle body, and a motor for driving one of side gears arranged in the differential for rotation. According to this configuration, since a differential function, i.e., rotation of the one driving axle with the case of the differential maintained fixed causes the other driving axle to reversely rotate, can be effectively utilized, a diving force for turning the vehicle body can be provided only by adding a minimally required function.

Further, a vehicle equipped with a turning mechanism according to the present invention comprises a rotatably supporting device for supporting one of front and rear pairs of left and right wheels, to which a running torque produced by a driving source is not transmitted, for rotation concerning respective axes perpendicular to the ground; a rotation driving device for rotating the one pair of left and right wheels from straight traveling positions taken when the vehicle is running to respective angular positions along tangential directions of an arc passing the respective axes perpendicular to the ground of the one pair of left and right wheels, with the center located near a center point of a rotating axle for running the vehicle of the other of the front and rear pairs of left and right wheels; motors for applying rotating torques to the one pair of left and right wheels at the angular positions along the tangential directions to turn a vehicle body on a neighborhood of the center point of the rotating axle for running the vehicle of the other pair of left and right wheels; a turn instructing device for generating a left or right turn instruction in response to a manipulation; and a voltage applying device for applying the motors with a gradually increasing driving voltage in response to the turn instruction.

In the four-wheel vehicle of the present invention described above, as a left or right turn instruction is generated in response to a manipulation, the motors are applied with a gradually increasing driving voltage, such that the motors apply rotating torques to the one pair of left and right wheels to turn the vehicle body on a neighborhood of a center point of the rotating axle for running the vehicle of the other pair of left and right wheels, so that the turning speed is gradually increased in the counterclockwise or clockwise turning direction. Therefore, the vehicle is prevented from suddenly turning immediately after the left or right turning instruction is generated, so that the driver can turn the vehicle body to a desired position with a good operability.

The voltage applying device gradually increases the driving voltage for a predetermined time, and thereafter maintains the driving voltage at a constant level. In this way, it is possible to prevent a turning speed from excessively increasing.

The motors rotate the one pair of left and right wheels in the counterclockwise direction in response to the left turn signal to turn the vehicle body counterclockwise, and rotate the one pair of left and right wheels in the clockwise direction in response to the right turn signal to turn the vehicle body clockwise. According to this configuration, the vehicle body can be turned either in the counterclockwise or clockwise direction with a simple manipulation.

The motors are provided for the respective left and right wheels of the one pair. With this configuration, each of the left and right wheels forming the pair can be driven for rotation with a simple structure.

The four-wheel vehicle further includes a turn stop instructing device for generating a turn stop instruction in response to a manipulation; and a braking force applying device for applying the motors with a gradually increasing braking force in response to the turn stop instruction. According to this configuration, since the turning speed is gradually decelerated in response to a manipulation performed by the driver when he wants to stop turning the vehicle body, the turning speed will not be suddenly decelerated, thereby allowing the driver to readily stop turning the vehicle body to place the vehicle at a desired position.

The turn instructing device and the turn stop instructing device are arranged integral with a steering wheel. According to this configuration, the driver can perform a turning operation while holding the steering wheel.

Also, a four-wheel vehicle equipped with a turning mechanism according to the present invention comprises a rotatably supporting device for supporting one of front and rear pairs of left and right wheels, to which a running torque produced by a driving source is not transmitted, for rotation concerning respective axes perpendicular to the ground; a rotation driving device for rotating the one pair of left and right wheels from straight traveling positions taken when the vehicle is running to respective angular positions along tangential directions of an arc passing the respective axes perpendicular to the ground of the one pair of left and right wheels, with the center located near a center point of a rotating axle for running the vehicle of the other of the front and rear pairs of left and right wheels; motors for applying rotating torques to the one pair of left and right wheels at the angular positions along the tangential directions to turn a vehicle body on a neighborhood of the center point of the rotating axle for running the vehicle of the other pair of left and right wheels; a turn instructing device for generating a left or right turn instruction in response to a manipulation; and a voltage applying device for applying the motors with a driving voltage at a level corresponding to the amount of pressing force to an acceleration pedal during generation of the turn instruction.

In the four-wheel vehicle of the present invention, the motors are applied with a driving voltage at a level corresponding to the amount of pressing force to the acceleration pedal, which is applied while a turning instruction is being generated, such that the motors apply rotating torques to the one pair of left and right wheels to turn the vehicle body on a neighborhood of a center point of the rotating axle of the other pair of left and right wheels, causing the turning speed to increase in accordance with the amount of pressing force applied by the driver to the acceleration pedal in the counterclockwise or clockwise turning direction. Thus, the driver can turn the vehicle body without a feeling of physical disorder as compared with a normal running operation, and accordingly turn the vehicle body to a desired position with a good operability.

The four-wheel vehicle further comprises a transmission formed with a left turn shift position and a right turn shift position in addition to shift positions for transmission, wherein the turn instructing device generates the left turn instruction when a shift lever of the transmission is moved to the left turn shift position, and generates the right turn instruction when the shift lever of the transmission is moved to the right turn shift position. According to this configuration, the driver can readily perform a left turn or a right turn operation by manipulating the shift lever of the transmission.

The four-wheel vehicle further includes a braking force applying device for applying the motors with a braking force corresponding to the amount of pressing force to a brake pedal. According to this configuration, the turning speed can be decelerated in a manner similar to a normal running operation, so that the driver can readily stop turning the vehicle body to place the vehicle at a desired position.

The four-wheel applies the motors with a slight driving force when neither the acceleration pedal nor the brake pedal is not stepped on. According to this configuration, a torque such as a creep torque of an automatic transmission is applied to the one pair of left and right wheels, so that subtle driving can be accomplished by the driver stepping on the brake pedal.

DETAILED DESCRIPTION OF THE PREFERRED EMBODIMENTS

Embodiments of the present invention will hereinafter be described in detail with reference to the accompanying drawings.

Figure 1:
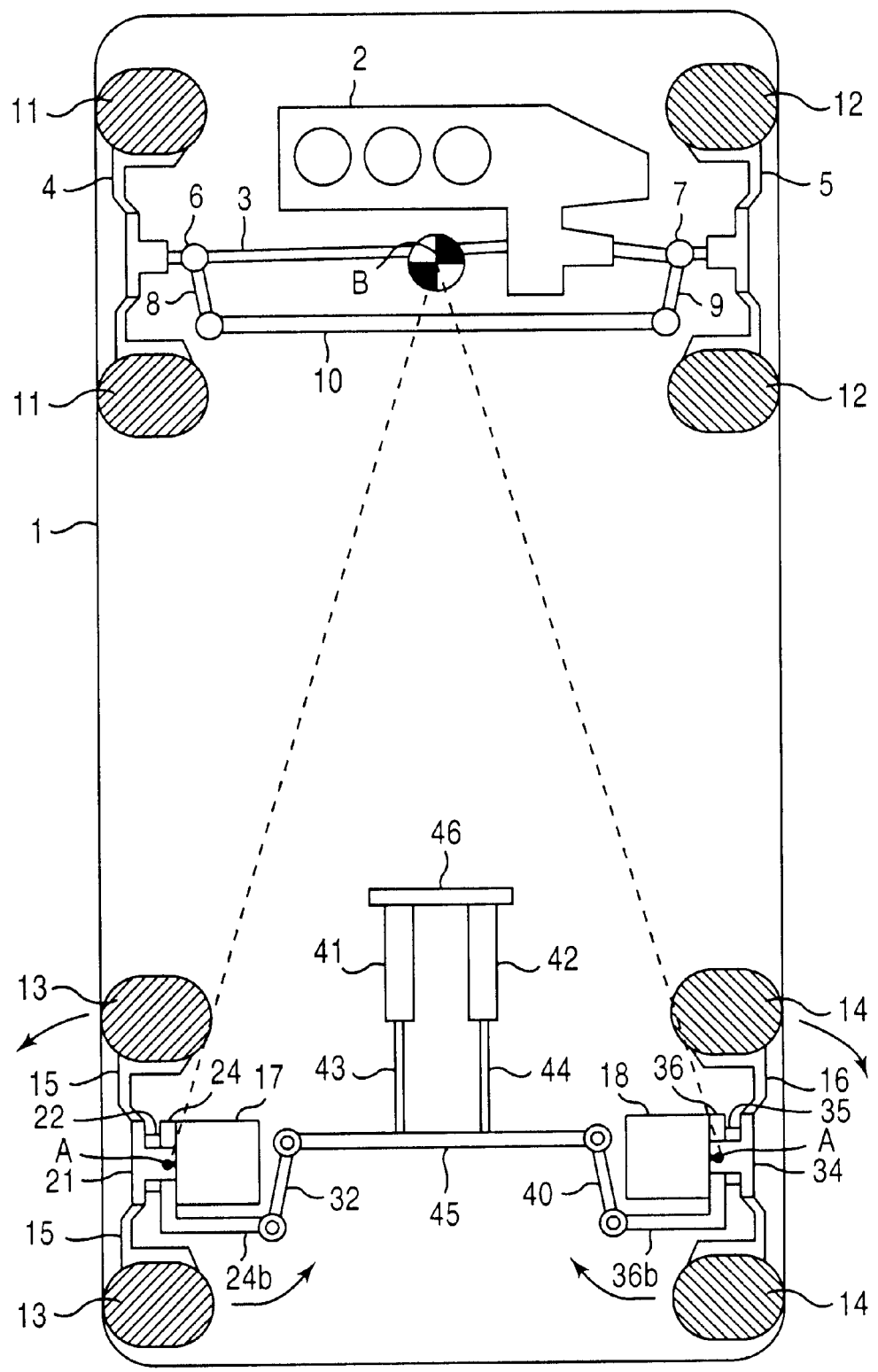
FIG. 1 is a diagram generally illustrating the structure of a four-wheel vehicle as an embodiment of the present invention.

FIG. 1 illustrates the general structure of a four-wheel vehicle equipped with a turning mechanism according to the present invention, viewed from a horizontal plane including the cross-sections of four front and rear tires 11–14 of the vehicle. The illustrated vehicle is a front wheel driven (FF) vehicle which has an engine body 2 positioned in a front portion of a vehicle body 1 to drive front wheels 4, 5 on the left and right sides to rotate through a driving axle 3. Front wheels 4, 5 inside the left and right front tires 11, 12 are coupled to a steering mechanism composed of knuckles 6, 7, knuckle arms 8, 9, and a tie rod 10.

Left and right rear wheels 15, 16 inside left and right rear tires 13, 14 in turn are rotatably arranged. Each of the rear wheels 15, 16 is coupled to a motor 17 or 18, such that the rear wheels 15, 16 are driven by the respective motors 17, 18 for rotation. The motors 17, 18, which function as driving sources for turning the vehicle body 1, are forward rotated when the vehicle body 1 is turned counterclockwise, and are reversely rotated when the vehicle body 1 is turned clockwise.

Figure 2:
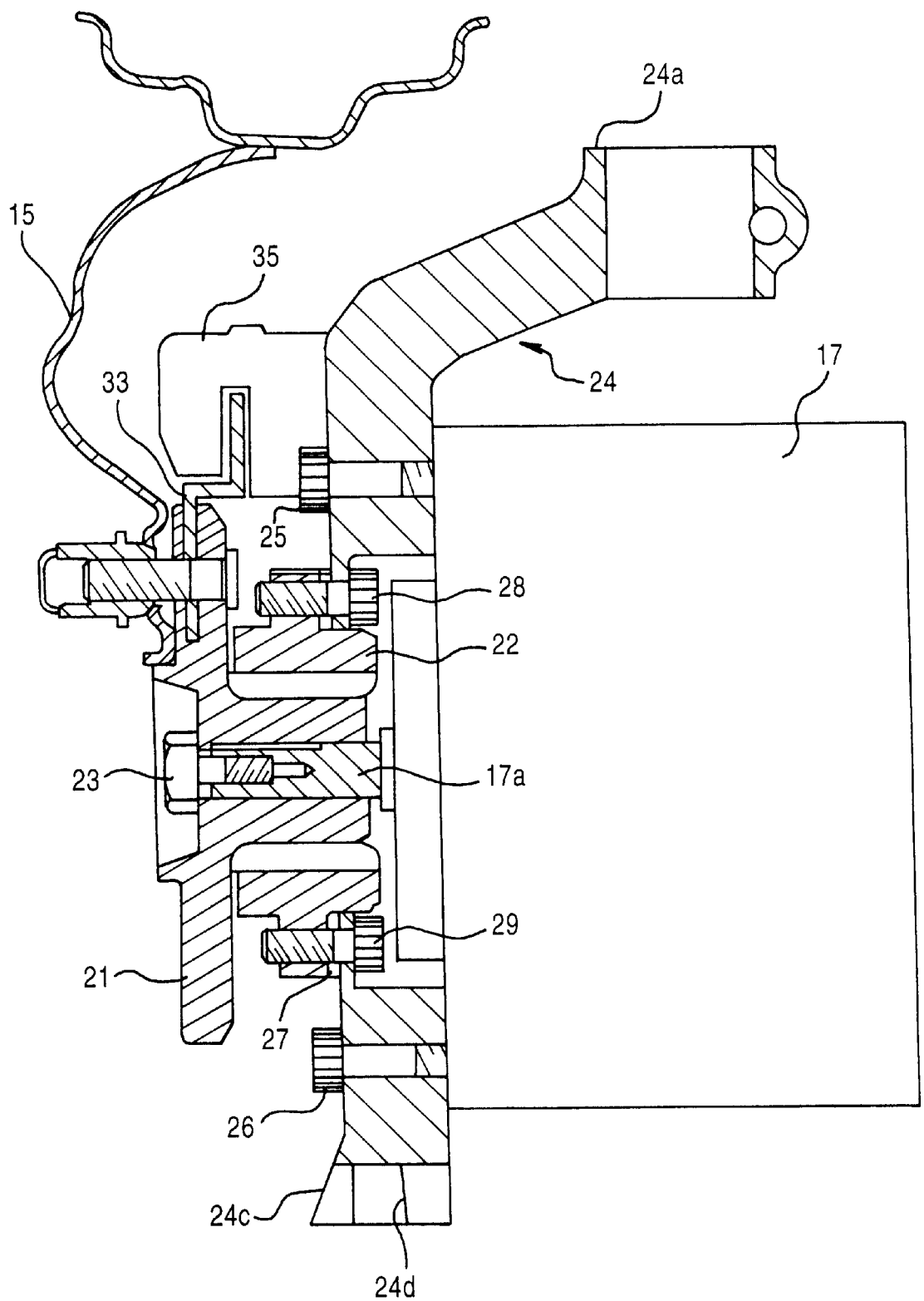
FIG. 2 is a cross-sectional view illustrating specifically a feature associated with a rear wheel.
Figure 3:
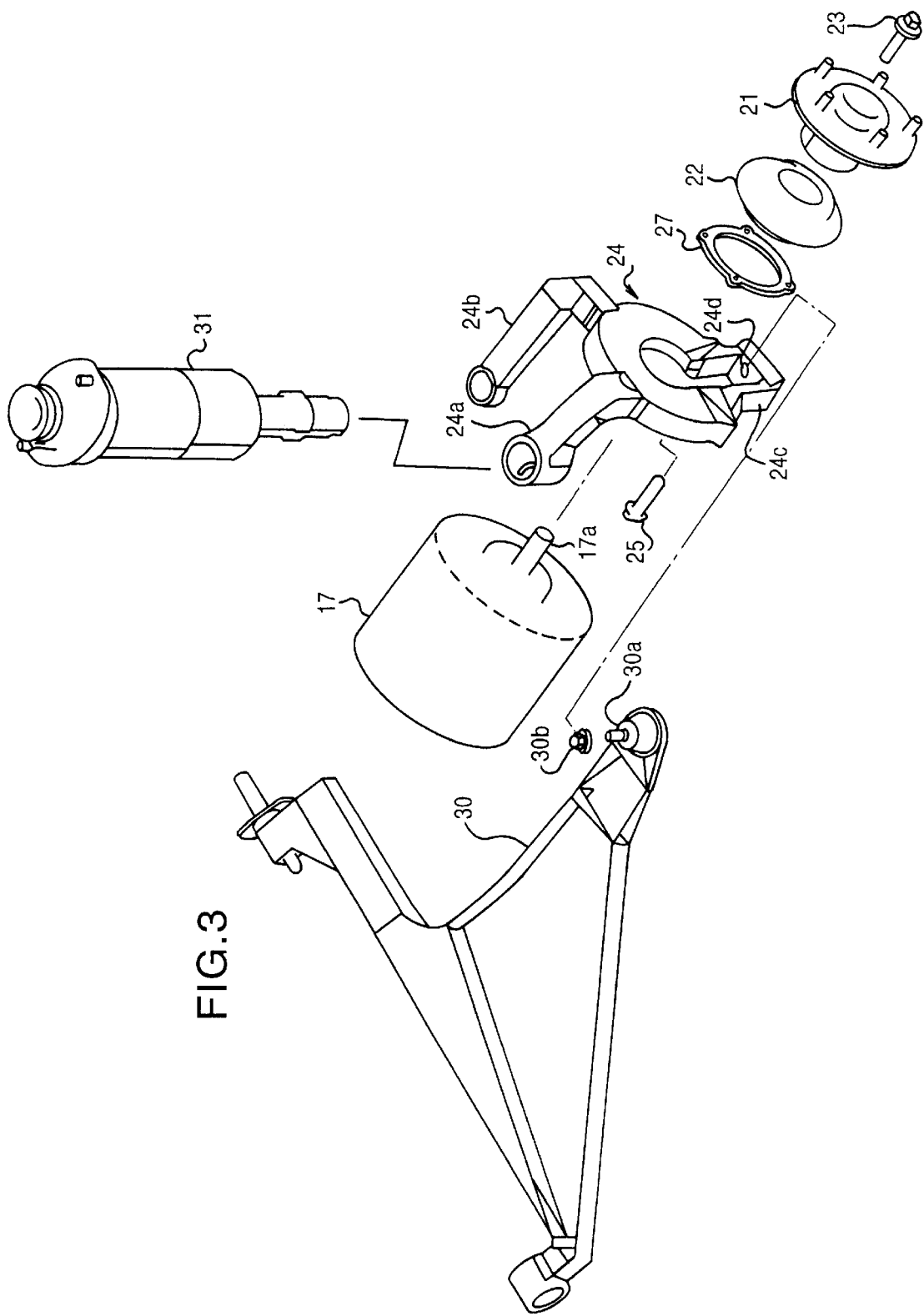
FIG. 3 is an assembling diagram illustrating the feature associated with the rear wheel of FIG. 2.

A flange-shaped hub 21 is arranged at the center of the rear wheel 15, and the hub 21 is rotatably supported by a bearing 22, as specifically illustrated in FIGS. 2 and 3. A rotating shaft 17a of the motor 17 is inserted into a central axial hole of the hub 21 from the inside, and a bolt 23 is screwed into the rotating shaft 17a from the outside of the hub 21 to couple the hub 21 and the rotating shaft 17a of the motor 17. The motor 17 is secured to a ring-shaped knuckle 24 on a protruding surface of the rotating shaft 17a with bolts 25, 26. As can be seen in FIG. 3, the knuckle 24 has a lower portion cut away from the ring shape thereof, which serves as a support 24c pivotally coupled to a screw 30a of a trailing arm 30. More specifically, the screw 30a of the trailing arm 30 is inserted into a throughhole 24d of the support 24c from below, and the screw 30a is screwed into a nut 30b. This pivotal coupling of the trailing arm 30 to the knuckle 24 enables the rear wheel 15 to pivotally move on an axis perpendicular to the ground.

Also, a bearing 22 is secured to the knuckle 24 through a washer 27 with bolts 28, 29. The knuckle 24 has two knuckle arms 24a, 24b extending from the outer periphery thereof, with a shock absorber 31 coupled to the leading end of the knuckle arm 24a. The knuckle arm 24b, which is formed in L-shape, is coupled to one end of a connecting arm 32 which forms part of a turning mechanism. The connecting arm 32 is arranged for two-dimensional pivotal movements on the coupling point.

A brake disk 33 is also fixed to the hub 21, and a brake caliper 35 is fixed to the knuckle 24, such that the brake disk 33 comes in contact with the brake caliper 35 to generate a braking force in response to the driver stepping on a brake pedal, not shown.

It will be understood that while FIGS. 2 and 3 illustrate only the feature associated with the coupling of the left rear wheel 15 and the motor 17, a feature associated with the coupling of the right rear wheel 16 and the motor 18 is formed symmetric to the feature associated with the coupling of the left rear wheel 15.

Figure 4:
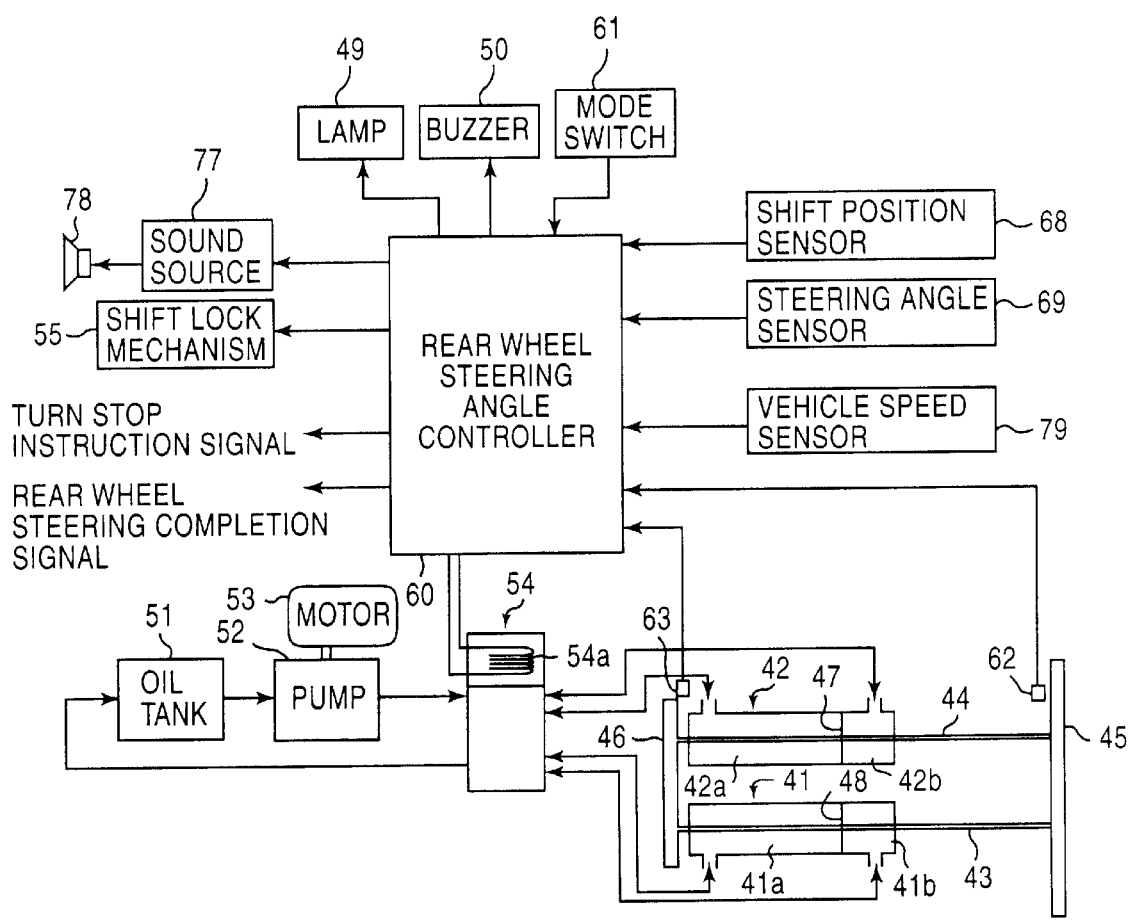
FIG. 4 is a block diagram illustrating a rear wheel steering system including a hydraulic circuit and an electrical circuit.

As illustrated in FIG. 1, the turning mechanism comprises a right connecting arm 40, two hydraulic cylinders 41, 42, two rods 43, 44, and two rims 45, 46 in addition to the above-mentioned left connecting arm 32. The hydraulic cylinders 41, 42 are fixed to the vehicle body 1 in parallel with each other such that pistons 47, 48 arranged therein are slidable in the longitudinal direction of the vehicle body 1, as illustrated in FIG. 4 later described. The rods 43, 44 extend through the corresponding hydraulic cylinders 41, 42. The rims 45, 46 are bar-shaped members which serve as stoppers. The rim 45 has one end coupled to the other end of the connecting arm 32 for two-dimensional pivotal movements and the other end similarly coupled to the other end of the connecting arm 40 for two-dimensional pivotal movements. The rims 45, 46 are arranged in parallel with each other, with the rods 43, 44 interposed therebetween. Each of the rods 43, 44 has one end secured to the rim 45, and the other end secured to the rim 46. The rods 43, 44 are coupled to and extend through the pistons 47, 48 in the hydraulic cylinders 41, 42, respectively, so that the rods 43, 44 are associated with movements of the pistons 47, 48.

The hydraulic cylinders 41, 42 are formed with oil chambers 41a, 41b, 42a, 42b, respectively, on both sides thereof divided by the respective pistons 47, 48, and each of the oil chambers is formed with oil inlet and outlet.

In a normal mode, the pistons 47, 48 are positioned on the rear side of the vehicle within the hydraulic cylinders 41, 42 by a rear wheel steering system, later described, forcing the rear tires 13, 14 to be set in a straight traveling attitude in association with that positioning. In a turn mode, the pistons 47, 48 are positioned on the front side of the vehicle within the hydraulic cylinders 41, 42 by the rear wheel steering system, forcing the rear tires 13, 14 to be set in an internally inclined attitude, as will be later described, in association with that positioning.

FIG. 4 illustrates the rear wheel steering system including a hydraulic circuit and an electrical circuit for the hydraulic cylinders 41, 42. The hydraulic circuit has an oil tank 51, a hydraulic pump 52, a motor 53, and an electromagnetic valve 54. The motor 53 is provided for driving the hydraulic pump 52. Oil within the oil tank 51 is discharged by the hydraulic pump 52 and supplied to the electromagnetic valve 54. The electromagnetic valve 54 has an oil inlet from the pump 52 and an oil outlet to the oil tank 51. The electromagnetic valve 54 also has four ports individually connected to the respective oil chambers 41a, 41b, 42a, 42b of the hydraulic cylinders 41, 42. The electromagnetic valve 54 is operated to switch the hydraulic circuit such that the oil inlet is internally in oil communication with two ports from the oil chambers 41a, 42a, while the oil outlet is in oil communication with two ports from the oil chambers 41b, 42b, when a solenoid 54a of the electromagnetic valve 54 is in a non-excited state, and the oil inlet is internally in oil communication with the two ports from the oil chambers 41b, 42b, while the oil outlet is in oil communication with the two ports from the oil chambers 41a, 42a when the solenoid 54a of the electromagnetic valve 54 is in an excited state. It should be noted that pipe lines arranged between the oil tank 51, the hydraulic pump 52, the electromagnetic valve 54, and the hydraulic cylinders 41, 42 are simply indicated by solid lines and not designated by reference numerals in FIG. 4.

A rear wheel steering angle controller 60 controls the driving of the motor 53, and switches the solenoid 54a of the electromagnetic valve 54 between the excited and non-excited states. The rear wheel steering angle controller 60 comprises a microcomputer which operates in accordance with an associated program. The rear wheel steering angle controller 60 is connected to a mode switch 61 which is manipulated by the driver to instruct the turn mode, and rim sensors 62, 63 for detecting the positions of the rims 45, 46, respectively. The rim sensor 62 generates a turn position signal when the rim 45 is at a position close to the hydraulic cylinders 41, 42, while the rim sensor 63 generates a straight traveling position signal when the rim 46 is at a position close to the hydraulic cylinders 41, 42. In addition, the rear wheel steering angle controller 60 is connected to a lamp 49 and a buzzer 50, so that the lamp 49 blinks or lights in the turn mode, and the buzzer 50 generates intermittent or continuous alarming sound in the turn mode.

Further, the rear wheel steering angle controller 60 is connected to a shift position sensor 68 for detecting a shift position of a transmission (not shown) of the vehicle, and a steering angle sensor 69 for detecting a steering angle of the front wheels 4, 5. The shift position sensor 68 supplies the rear wheel steering angle controller 60 with a P position signal when the shift position of the transmission of the vehicle is in a P (parking) position. The steering angle sensor 69 detects a steering angle, for example, based on the rotating angle of a steering wheel (indicated by reference numeral 92 in FIG. 6).

The transmission as described is provided with a shift lock mechanism 55. The shift lock mechanism 55 disables the shift lever to be shifted from the P position to another position such as an R (reverse), N (Neutral), D (Drive), "2" (second gear), "1" (first gear), or the like. For example, the shift lever is electromagnetically locked so that such shifting is disabled. The shift lock mechanism 55 is controlled by the rear wheel steering angle controller 60.

Each of the motors 17, 18 is applied with a supply voltage, a normal/reverse rotation signal indicative of a rotating direction, a speed signal for specifying a rotational speed, a brake signal for instructing a braking operation, and a reset signal for prohibiting a turn. The supply voltage and respective signals are controlled individually by a turn controller 70.

Figure 5:
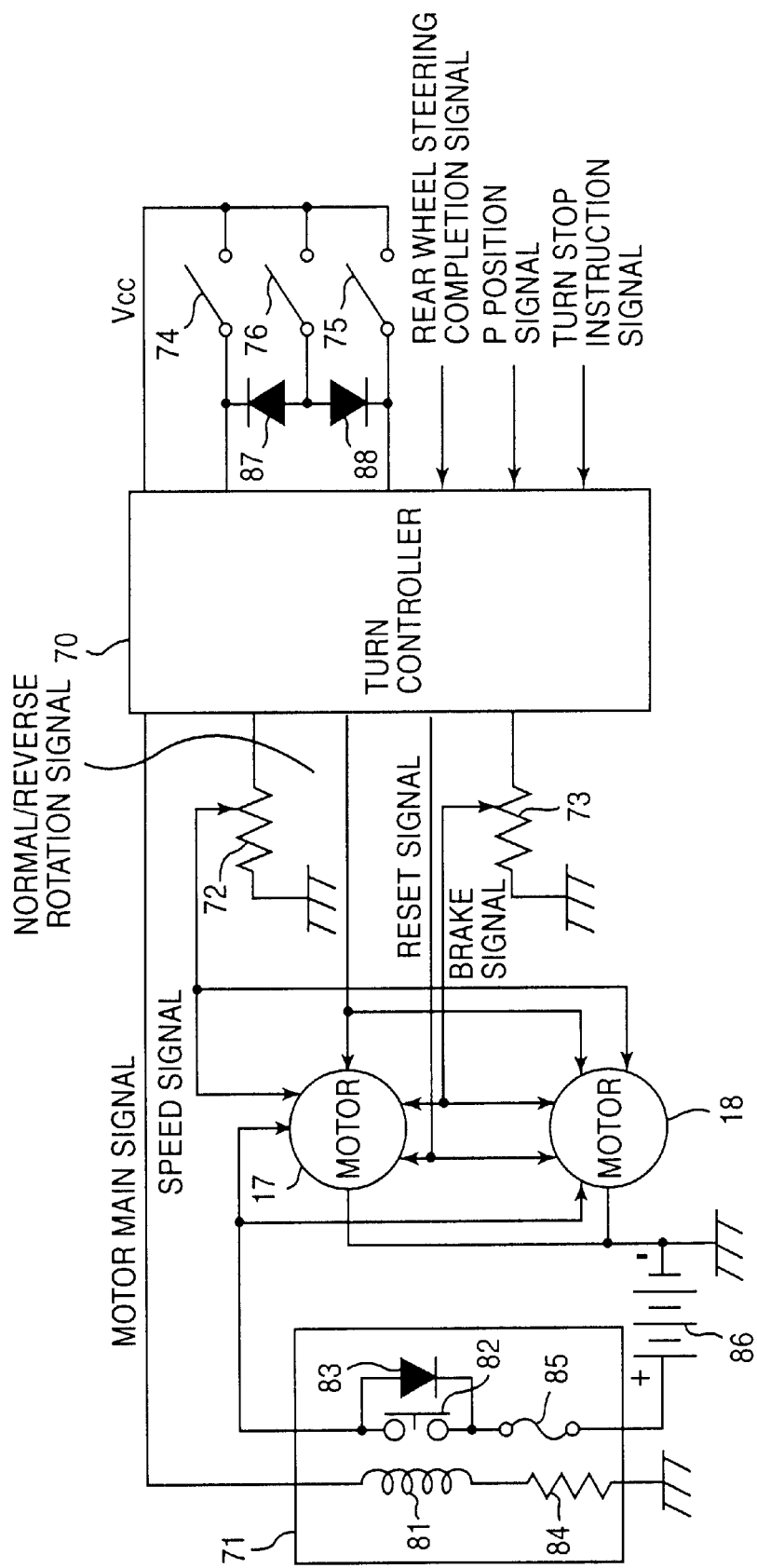
FIG. 5 is a circuit diagram illustrating a driving control system.

FIG. 5 illustrates a driving control system for the motors 17, 18. The driving control system comprises, in addition to the turn controller 70, a relay unit 71, a speed adjusting volume 72, a brake adjusting volume 73, left and right turn switches 74, 75, and a brake switch 76. The turn controller 70 is based on a microcomputer. The left and right turn switches 74, 75 and the brake switch 76 are switches which turn ON only when they are manipulated.

The relay unit 71 comprises a relay coil 81, a relay switch 82, a diode 83, a resistor 84, and a fuse 85. The relay coil 81 and the resistor 84 are connected in series, and arranged such that the relay coil 81 is excited as the relay coil 81 and the resistor 84 are supplied with a motor main signal output from the turn controller 70. The relay switch 82 and the diode 83 are connected in parallel to form a parallel circuit which has one end connected to a positive terminal of a buttery 86, which serves as a power supply, through the fuse 85, and the other end connected to a positive input terminal of a voltage source for the motors 17, 18. The voltage source for the motors 17, 18 has its negative terminal connected to a negative terminal of the battery 86 for grounding.

The normal/reverse rotation signal, the speed signal, the brake signal and the reset signal are generated from the turn controller 70. The normal/reverse rotation signal and the reset signal are supplied as they are to the motors 17, 18. The speed signal is supplied to the motors 17, 18 through a speed adjusting volume 72, while the brake signal is supplied to the motors 17, 18 through the brake adjusting volume 73. The speed adjusting volume 72 and the brake adjusting volume 73 adjust the level of the speed signal and the level of the brake signal in response to manipulations made thereon, respectively.

Each of the left and right turn switches 74, 75 and the brake switch 76 has one end applied with a voltage Vcc corresponding to a high level, while each of the left and right turn switches 74, 75 has the other end connected to input terminals INL, INR of the turn controller 70. The brake switch 76 has the other end connected to the other ends of the left and right turn switches 74, 75, respectively, with diodes 87, 88 interposed therebetween. The diodes 87, 88 are arranged to set the other ends of the respective left and right turn switches 74, 75 to high level when the brake switch 76 is ON.

The turn controller 70 is supplied with a steering completion signal indicative of the completion of turn steering angle control from the rear wheel steering angle controller 60 as well as supplied with the P position signal.

Figure 6:
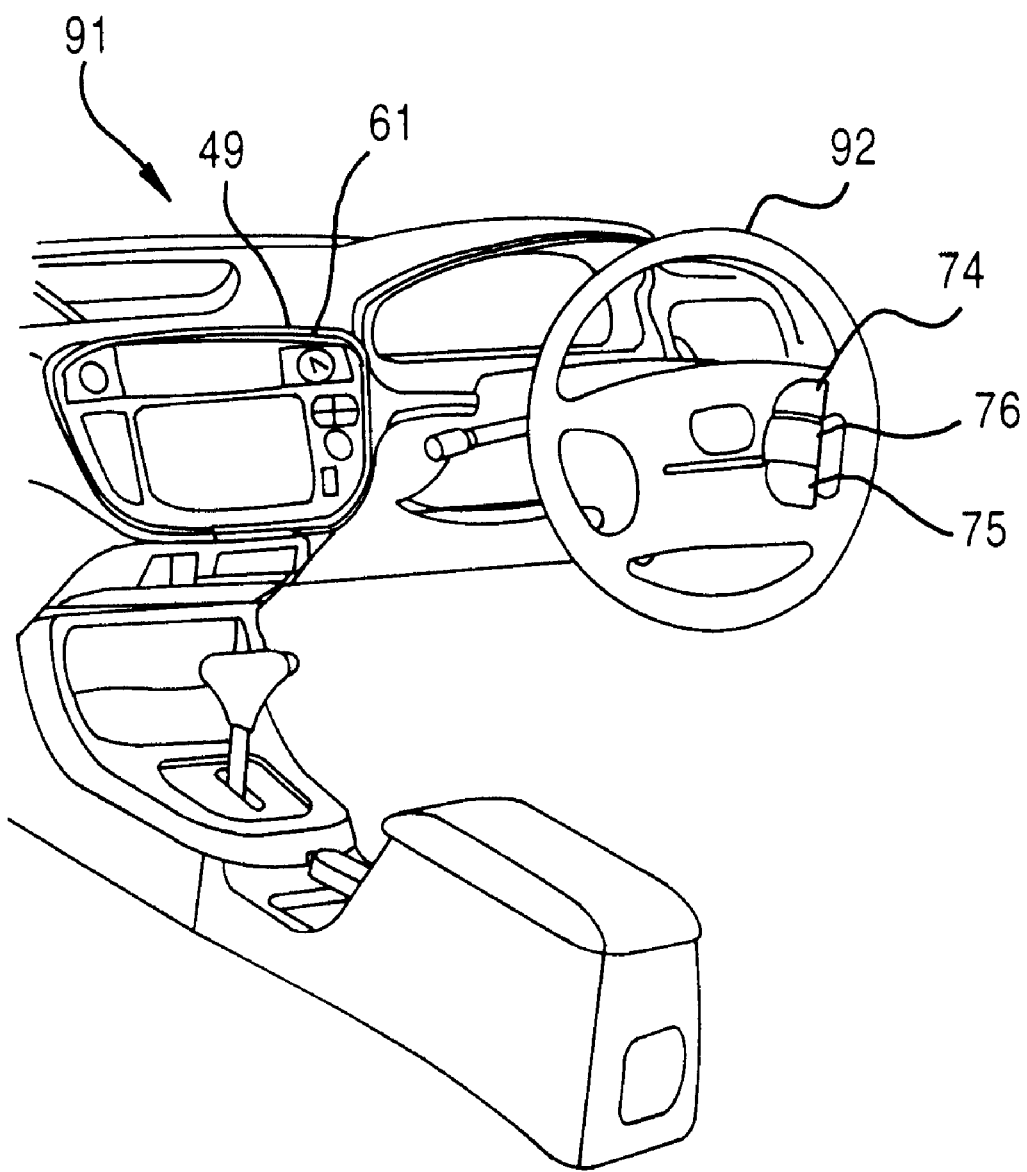
FIG. 6 is a diagram illustrating where switches and lamps shown in FIGS. 4 and 5 are disposed within the vehicle.

FIG. 6 illustrates positions at which the mode switch 61, the turn switches 74, 75, and the brake switch 76 are disposed within the vehicle. The mode switch 61 is located in a central portion of a front panel 91, while the turn switches 74, 75 and the brake switch 76 are arranged integral with a steering wheel 92. Also, around the mode switch 61, a lighting or blinking display is provided by the lamp 49.

Next, the operation of the foregoing turning mechanism will be described in accordance with associated programs processed by the rear wheel steering controller 60 and the turn controller 70. The rear wheel steering angle controller 60 executes a rear wheel steering routine, while the turn controller 70 executes a turn control routine.

Figure 7:
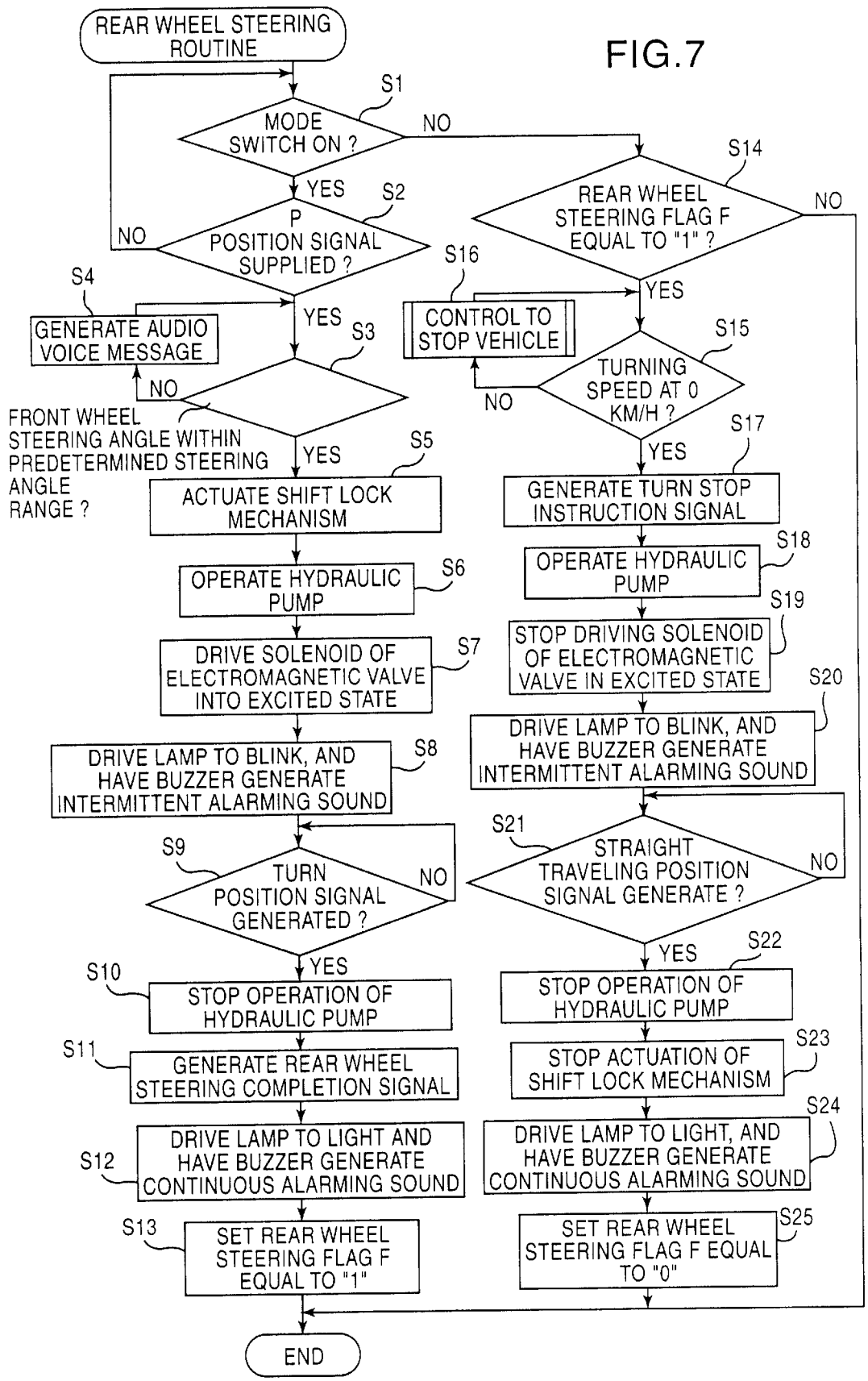
FIG. 7 is a flow chart illustrating a rear wheel steering routine.

First, in the rear wheel steering routine as illustrated in FIG. 7, the rear wheel steering angle controller 60 determines whether or not the mode switch 61 is ON (step S1). As the mode switch 61 is turned ON, the rear wheel steering angle controller 60 determines whether or not the P position signal has been supplied thereto from the shift position sensor 68 (step S2). This step S2 is provided for determining whether or not the vehicle is stopped. When the P position signal has been supplied, the rear wheel steering angle controller 60 determines whether or not a front wheel steering angle sensed by the steering angle sensor 69 lies within a predetermined steering angle range in which the driver can travel the vehicle straight (step S3). Step S3 is provided for determining that the front wheels 4, 5 are in a straight traveling attitude for permitting the vehicle to travel straight.

When the determinations at steps S2, S3 result in affirmative answers, this means that the vehicle stops running with the front wheels 4, 5 remaining in the straight traveling attitude, in which case the turning angle control can be started.

When determining that the front wheel steering angle does not lie within the predetermined steering angle range, the rear wheel steering angle controller 60 has a sound source 77 generate a voice message (step S4). This voice message may be a message for drawing attention of the driver such as "Return the handle," which is generated in the sound source 77 as an audio signal and output through a speaker 78. After step S3, the rear wheel steering routine returns to step S3.

When determining that the front wheel steering angle lies within the predetermined steering angle range, the rear wheel steering angle controller 60 actuates the shift lock mechanism 55 (step S5). The actuated shift lock mechanism 55 results in locking the shift lever of the transmission during a turning operation of the vehicle body 1. Since the locked shift lever is prevented from being shifted to another position such as R, N, D, "2," "1" or the like, the turning operation of the vehicle body 1 will not be interrupted due to an erroneous manipulation.

After executing step S5, the rear wheel steering angle controller 60 drives the motor 53 to operate the hydraulic pump 52 in order to start the turn steering angle control (step S6), and drives the solenoid 54a of the electromagnetic valve 54 into an excited state (step S7). In addition, the rear wheel steering angle controller 60 drives the lamp 49 to blink, and has the buzzer 50 generate intermittent alarming sound (step S8). The execution of steps S6 and S7 causes the hydraulic pump 52 to discharge oil within the oil tank 51, which is supplied to the oil chambers 41b, 42b in the respective hydraulic cylinders 41, 42 through the electromagnetic valve 54. On the other hand, the oil chambers 41a, 42a in the respective oil cylinders 41, 42 communicate with the oil tank 51 through the electromagnetic valve 54, so that the oil within the oil chambers 41a, 42a returns to the oil tank 51 through the electromagnetic valve 54. Thus, the oil discharged from the oil tank 51 by the hydraulic pump 52 is supplied to the oil chambers 41b, 42b and acts to increase the volumes of the oil chambers 41b, 42b and therefore presses the pistons 47, 48 toward the oil chambers 41a, 42a. As the pistons 47, 48 are moved toward the oil chambers 41a, 42a, the rods 43, 44 and the rims 45, 46 are moved toward the front of the vehicle, associated with the movements of the pistons 47, 48.

As the rim 45 is moved toward the front of the vehicle, the left and right knuckle arms 24b, 36b are pulled toward the front of the vehicle through the left and right connecting arms 32, 40, causing pivotal movements of the left and right rear wheels 15, 16 on supporting shafts (indicated by reference letters A in FIG. 1) of the knuckles 24, 36 in a direction indicated by arrows shown in FIG. 1. More specifically, the movement of the rim 45 causes pivotal movements of the rear tires 13, 14, the motors 17, 18, the knuckles 24, 36, and portions coupled to the rotating shafts 17a, 18a of the motors 17, 18 as well as the rear wheels 15, 16.

During the pivotal movements of the left and right wheels 15, 16, the lamp 49 is driven to blink, while the buzzer 50 generates intermittent alarming sound.

Figure 8:
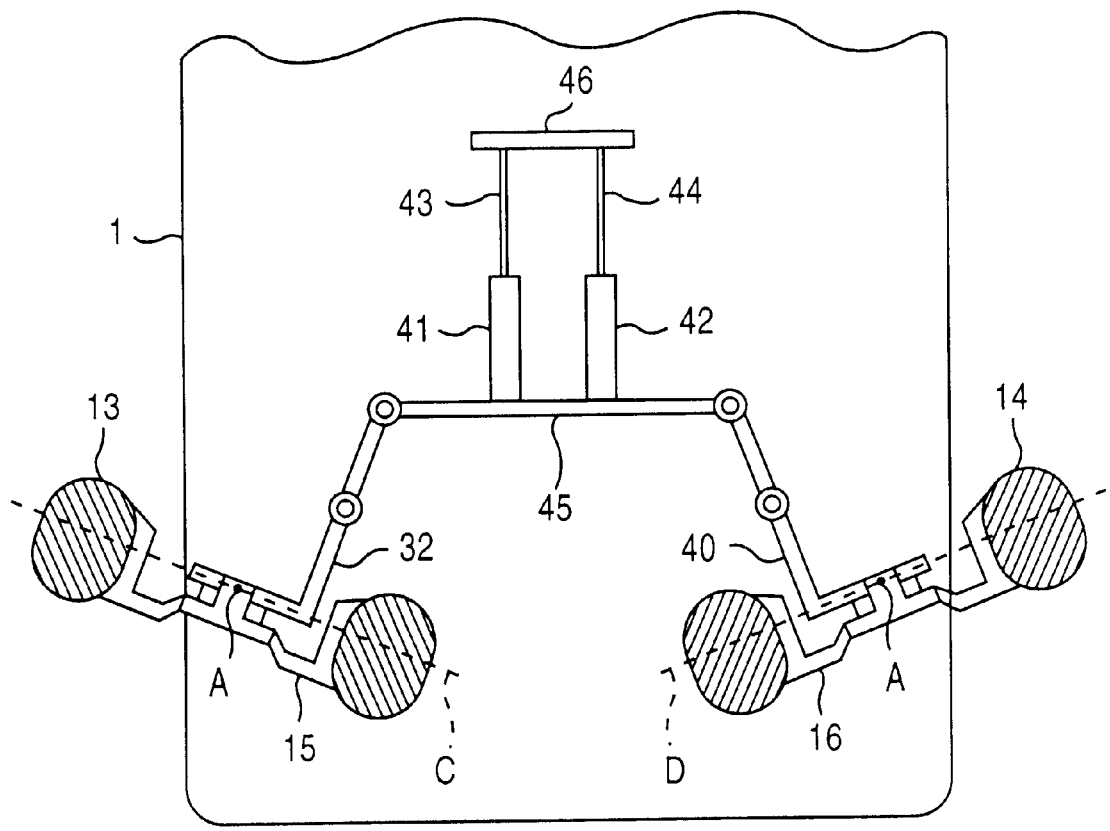
FIG. 8 is a diagram illustrating the state of rear wheels in a turn mode.

After executing step S5, the rear wheel steering angle controller 60 determines whether or not the turn position signal has been generated (step S9). As the rim 45 moves to a position close to the hydraulic cylinders 41, 42, the rim sensor 62 generates the turn position signal. When the turn position signal is generated, the left and right rear wheels 15, 16 are generally brought into internally inclined attitude as illustrated in FIG. 8. In the illustrated state, the left and right rear wheels 15, 16 are defined at predetermined angular positions along tangential directions of an arc passing the points indicated by reference letters A in FIG. 1, with the center of the arc (indicated by reference letter B in FIG. 1) being located in a central portion of the rotating axle of the front wheels 4, 5. Broken lines C, D in FIG. 8 indicate the tangential positions. The point indicated by reference letter A is at the position of the screw 30a of the trailing arm 30 on the left side of the vehicle, which is the point at which the knuckle 24 intersects the shaft 17a of the motor 17. Likewise, on the right side of the vehicle, the point indicated by reference letter A is at the position at which the knuckle 36 intersects the shaft of the motor 18.

As the turn position signal is generated, the rear wheel steering angle controller 60 stops driving the motor 53 to stop the operation of the hydraulic pump 52 (step S10), and generates a rear wheel steering completion signal to the turn controller 70 (step S11). Also, the rear wheel steering angle controller 60 drives the lamp 49 to blink, has the buzzer 50 generate continuous sound (step S12), and set a rear wheel steering flag F equal to "1" (step S13). The rear wheel steering flag F is initially set to "0."

Upon determining at step S1 that the mode switch 61 is OFF, the rear wheel steering angle controller 60 determines whether or not the rear wheel steering flag F is "1" (step S14). If the rear wheel steering flag F is equal to "0," the operation of this routine is terminated. On the other hand, if the rear wheel steering flag F is equal to "1," the rear wheel steering angle controller 60 determines whether or not a turning speed is at 0 km/h (step S15). The turning speed is detected by a vehicle speed sensor 79. The vehicle speed sensor 79 may be any one which can detect that the rotations of the rear wheels 15, 16 are stopped. If the vehicle turning speed is not at 0 km/h, i.e., if the vehicle 1 is turning, the rear wheel steering angle controller 60 performs stop control for stopping the turning of the vehicle 1 (step S16). This stop control may involve supplying the motors 17, 18 with a brake signal, or braking the rotations of the rear wheels 15, 16 by bringing the brake caliper 35 into contact with the brake disk 33 for the left rear wheel and likewise bringing a brake caliper into contact with an associated brake disk, both not shown, for the right rear wheel.

If the vehicle is stopped with the turning speed at 0 km/h, the mode switch 61 has been turned OFF to recover the original straight traveling steering angle for the left and right wheels 15, 16, which have been controlled to be in the internally inclined attitude to have a steering angle suitable for turning, so that the rear wheel steering angle controller 60 generates a turn stop instruction signal to the turn controller 70 (step S17), drives the motor 53 to operate the hydraulic pump 52 (step S18), and stops driving the solenoid 54a of the electromagnetic valve 54 in the excited state (step S19). In addition, the rear wheel steering angle controller 60 drives the lamp 49 to blink, and has the buzzer 50 generate intermittent sound (step S20). The execution of steps S18 and S19 causes the hydraulic pump 52 to discharge oil within the oil tank 51, and the internal paths of the electromagnetic valve 54 to be switched, so that the discharged oil is supplied to the oil chambers 41a, 42a of the respective hydraulic cylinders 41, 42 through the electromagnetic valve 54. On the other hand, the oil chambers 41b, 42b of the hydraulic cylinders 41, 42 communicate with the oil tank 51 through the electromagnetic valve 54 to return the oil within the oil chambers 41b, 42b to the oil tank 51 through the electromagnetic valve 54. Thus, the discharged oil from the oil tank 51 by the hydraulic pump 52 is supplied to the oil chambers 41a, 42a, thereby acting to increase the volumes of the oil chambers 41a, 42a to press the pistons 47, 48 toward the oil chambers 41b, 42b. The movements of the pistons 47, 48 toward the oil chambers 41b, 42b causes associated movements of the rods 43, 44 and the rims 45, 46 to the rear of the vehicle.

As the rim 45 moves toward the rear of the vehicle, the left and right knuckle arms 24b, 36b are pressed to the rear of the vehicle through the left and right connecting arms 32, 40, respectively, thus causing pivotal movements of the left and right rear wheels 15, 16 on the supporting shafts of the knuckles 24, 36 such that the wheels 15, 16 are oriented in the straight traveling direction of the vehicle. More specifically, the movement of the rim 45 causes pivotal movements of the rear tires 13, 14, the motors 17, 18, the knuckles 24, 36, and portions coupled to the rotating shafts 17a, 18a of the motors 17, 18 as well as the rear wheels 15, 16.

During the pivotal movements of the left and right rear wheels 15, 16, the lamp 49 is driven to blink, while the buzzer 50 generates intermittent alarming sound.

After executing step S15, the rear wheel steering angle controller 60 determines whether or not the straight traveling position signal has been generated (step S21). As the rim 46 moves to a position close to the hydraulic cylinders 41, 42, the rim sensor 63 generates the straight traveling position signal. When the straight traveling position signal is generated, the left and right rear wheels 15, 16 are generally returned to the original straight traveling attitude as illustrated in FIG. 1.

As the straight traveling position signal is generated, the rear wheel steering angle controller 60 stops driving the hydraulic pump 52 (step S22), stops the actuation of the shift lock mechanism 55 (step S23), stops driving the lamp 49 and the buzzer 50 (step S24), and sets the rear wheel steering flag F equal to "0" (step S25).

Figure 9:
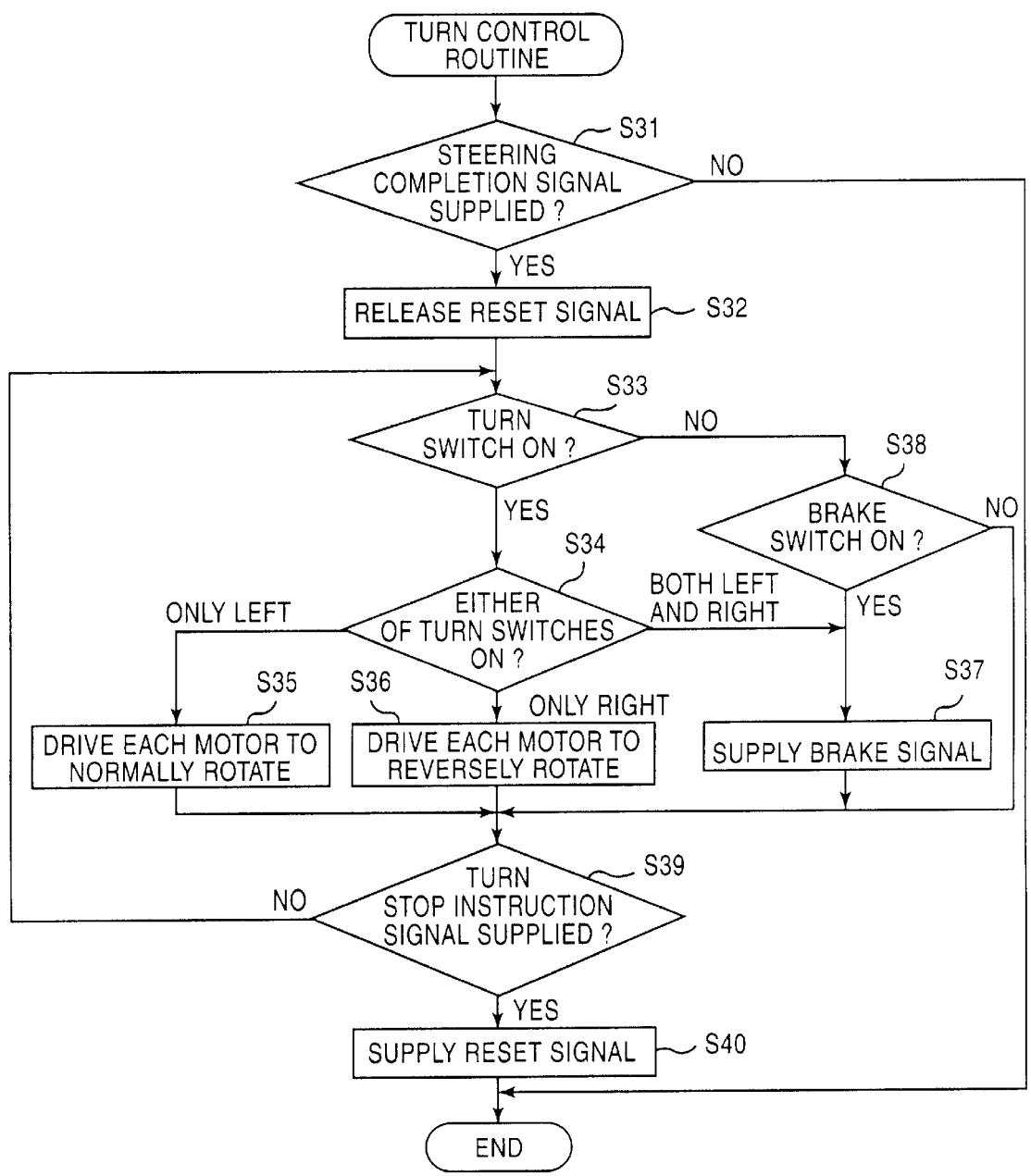
FIG. 9 is a flow chart illustrating a turn control routine.

Next, in the turn control routine as illustrated in FIG. 9, the turn controller 70 determines whether or not the rear wheel steering completion signal has been generated (step S31). As the rear wheel steering angle controller 60 has generated the steering completion signal at the aforementioned step S8, the steering completion signal is supplied to the turn controller 70.

Upon receipt of the steering completion signal, the turn controller 70 releases the reset signal (step S32). Since the motors 17, 18 are normally supplied with the reset signal from the turn controller 70 and therefore disabled to rotate, the reset signal supplied to the motors 17, 18 is stopped to bring the same into a motor operation waiting state.

After executing the step S32, the turn controller 70 determines whether or not the turn switches are ON (step S33). When at least one of the left and right turn switches 74, 75 is ON, the turn controller 70 determines which of the turn switches 74, 75 is ON (step S34). The turn controller 70 drives the motors 17, 18 to normally rotate when the left turn switch 74 alone is ON (step S35); drives the motors 17, 18 to reversely rotate when the right turn switch 75 alone is ON (step 36); and supplies a brake signal to the motors 17, 18 when both the left and right turn switches 74, 75 are ON (step S37). When both the left and right turn switches 74, 75 are OFF, the turn controller 70 determines whether or not the brake switch 76 is ON (step S38). When the brake switch 76 is ON, the turn control routine proceeds to step S37 where the turn controller 70 supplies the brake signal to the motors 17, 18 to stop driving the motors 17, 18. The braking signal supplied to the motors 17, 18 results in braking the rotation of the motors 17, 18.

When the operations at steps S33 to S38 indicate that the left turn switch 74 is manipulated to turn ON, the turn controller 70 supplies the motors 17, 18 with a normal/reverse rotation signal for specifying normal rotation, causing the motors 17, 18 to normally rotate in response to the normal/reverse rotation signal to drive the rear wheels 15, 16 to rotate, resulting in the vehicle turning counterclockwise. On the other hand, when the right turn switch 75 is manipulated to turn ON, the turn controller 70 supplies the motors 17, 18 with a normal/reverse rotation signal for specifying reverse rotation, causing the motors 17, 18 to reversely rotate in response to the normal/reverse rotation signal to drive the rear wheels 15, 16 to rotate, resulting in the vehicle turning clockwise. The center on which the vehicle is turned is positioned at the center of the rotating axle of the front wheels 4, 5, as mentioned above (indicated by reference letter B in FIG. 1). As the brake switch 76 is manipulated to turn ON, the turn controller 70 supplies the motors 17, 18 with a brake signal, to brake the rotation of the motors 17, 18 to stop. Likewise, when the left turn switch 74 and the right turn switch 75 are both manipulated to turn ON, the motors 17, 18 are supplied with the brake signal, and therefore brought into a braked state.

Upon driving the motors 17, 18 to normally or reversely rotate, as described above, the turn controller 70 supplies a motor main signal to the relay unit 71. In the relay unit 71, the relay coil 81 is excited in response to the motor main signal to turn the relay switch 83 ON. The relay switch 83 thus turned ON lets a current flow from the positive terminal of the battery 86, through the fuse 85, the relay switch 83 and the motors 17, 18, into the negative terminal of the battery 86. In this way, the motors 17, 18 are applied with an output voltage of the battery 86 to produce normal rotation or reverse rotation thereof.

After executing step S36, S37 or S38, the turn controller 70 determines whether or not the turn stop instruction signal has been supplied thereto (step S39). As the mode switch 61 is manipulated to turn OFF to cause the rear wheel steering angle controller 60 to generate the turn stop instruction signal at the aforementioned step S12, the turn stop instruction signal is supplied to the turn controller 70. If no turn stop instruction signal is supplied, the turn controller 70 returns to step S23 to repeat the foregoing operations. On the other hand, the turn stop instruction signal, if supplied, terminates the turning operation of the vehicle, so that the turn controller 70 supplies the reset signal to the motors 17, 18 (step S40), followed by the termination of this routine. The reset signal supplied to the motors 17, 18 results in locking the motors 17, 18 which are thus set into a rotation disabled state.

For making a turn, the driver first manipulates the transmission into the P position to allow the turn mode, and subsequently manipulates the mode switch 61 to turn ON. As a result, the vehicle is set into the turn mode, causing the left and right rear wheels 15, 16 so far oriented in the vehicle straight traveling direction to start pivotal movements on their respective vertical axes. During the pivotal movements, the lamp 49 blinks, and the buzzer 50 generates intermittent alarming sound. When the left and right rear wheels 15, 16 are brought into the internally inclined attitude as previously illustrated in FIG. 8, the lamp 49 is continuously lit, and the buzzer 50 generates continuous alarming sound. The driver recognizes through the lit lamp 49 or the continuous alarming sound of the buzzer 50 that a turning operation is enabled.

Then, as the driver manipulates the left turn switch 74 to turn ON, the motors 17, 18 are normally rotated to cause normal rotations of the rear wheels 15, 16, resulting in turning the vehicle counterclockwise. On the other hand, as the driver manipulates the right turn switch 75 to turn ON, the motors 17, 18 are reversely rotated to cause reverse rotations of the wheels 15, 16, resulting in turning the vehicle clockwise. For stopping the turning operation, the driver manipulates the brake switch 76 or both the left and right turn switches 74, 75 to turn ON. In this way, the motors 17, 18 are braked to stop the rotations of the motors 17, 18, i.e., the rotations of the rear wheels 15, 16.

After the driver has made a desired turn, the driver manipulates the mode switch 61 to turn OFF. The mode switch 61, when turned OFF, causes the lamp 49 to blink, and the buzzer 50 to generate intermittent alarming sound. Then, the left and right rear wheels 15, 16 now in the internally inclined attitude start pivotal movements on the respective vertical axes so as to orient in the vehicle straight traveling direction. As the left and right rear wheels are returned to the original vehicle straight traveling direction, the lamp 49 stops blinking, and the buzzer 50 stops generating the intermittent alarming sound. The driver recognizes through the unlit lamp 49 or the stopped intermittent alarming sound from the buzzer 50 that the turn mode has been terminated to set the vehicle again into the normal mode.

In the foregoing embodiment, the feature for engaging the knuckle 24 with the trailing arm 30 constitutes a rotatably supporting device which supports one of the left and right wheels rotatable on respective axes perpendicular to the ground, while the mode switch 61 corresponds to an instructing device. The execution of steps S2 and S3 by the rear wheel steering angle controller 60 corresponds to a determining device for determining whether or not the driving state of the vehicle satisfies a predetermined condition. The feature composed of the hydraulic cylinders 41, 42, the rods 43, 44, the rims 45, 46, and the connecting arms 32, 40 constitutes a rotating position fixing device. Also, the motors 17, 18 correspond to a turn driving device for applying a rotating torque to one of the left and right wheels to turn the vehicle.

Figure 10:
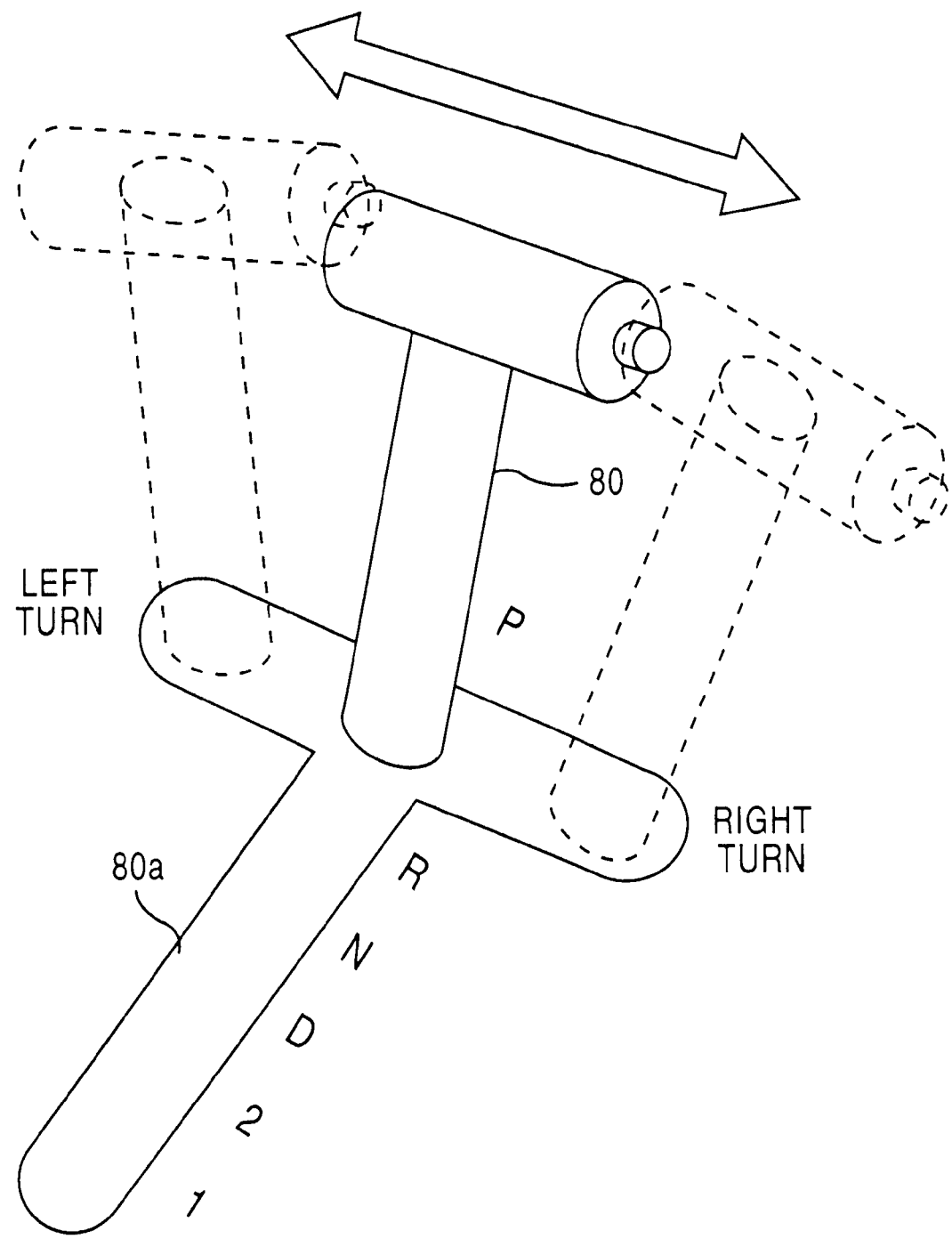
FIG. 10 is a diagram illustrating shift positions to which a shift lever of a transmission can be moved.

While in the foregoing embodiment, the turn switches 74, 75 are arranged integral with the steering wheel 92, the turn switches 74, 75 may be arranged as illustrated in FIG. 10 such that they are turned ON/OFF associated with the shift lever 80 of the transmission. More specifically, the shift lever 80 is arranged for shifting to turn shift positions, i.e., "left turn" and "right turn" (indicated by broken lines in FIG. 10) along a guide groove 80a in addition to shift positions "P," "R," "N," "D," "2," and "1" for transmission which are positioned linearly along the guide groove 80a. The shift position "left turn" is positioned on the left side of the shift position "P" while the shift position "right turn" is positioned on the right side of the shift position "P." The shift positions "left turn" and "right turn" are arranged such that the shift lever 80 cannot be shifted to the shift positions "left turn" or "right turn" unless it is once shifted to the shift position "P." The turn switch 74 is turned ON when the shift lever 80 is shifted to the shift position "left turn," while the turn switch 75 is turned ON when the shift lever 80 is shifted to the shift position "right turn." When the shift lever is kept at any of the remaining positions, the turn switches 74, 75 are OFF.

Figure 11:
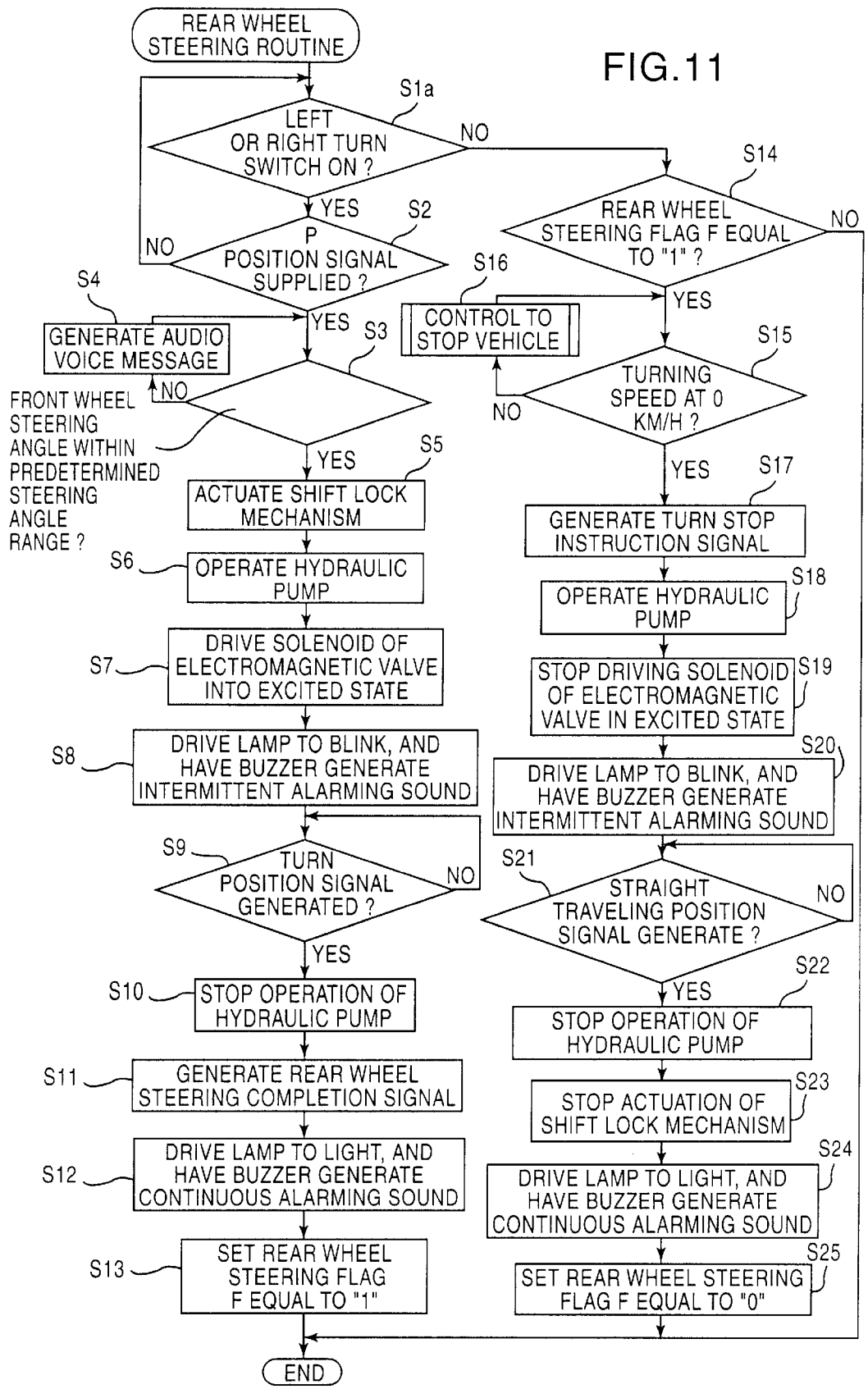
FIG. 11 is a flow chart illustrating another example of a rear wheel steering routine.

When the turn switches 74, 75 are turned ON/OFF associated with the shifting operation of the shift lever 80, the mode switch 61 is not needed. FIG. 11 illustrates a rear wheel steering routine for a vehicle which is equipped with the shift lever 80 as described above. In the rear wheel steering routine of FIG. 11, the rear wheel steering angle controller 60 determines whether or not any of the turn switches 74, 75 is ON (step S1*a*), instead of step S1 in the rear wheel steering routine of FIG. 7. The rear wheel steering angle controller 60 detects at step S1*a* that the shift lever 80 has been shifted from the shift position "P" to the shift position "turn left" or "turn right." When the turn switch 74 or 75 is ON, the rear wheel steering routine proceeds to step S2. On the other hand, when the shift lever 8 is shifted to the shift position "P" to cause both the turn switches 74, 75 to turn OFF, the rear wheel steering routine proceeds to step S13. The rest of the steps in the rear wheel steering routine of FIG. 11 are the same as those in the rear wheel steering routine of FIG. 7.

Since the foregoing embodiment has been described for a vehicle equipped with an automatic transmission, step S2 determines whether or not the shift position of the transmission lies in the P position. For a vehicle equipped with a manual transmission, step S2 may determine whether or not the shift position lies in a neutral position or whether or not a side brake has been actuated. Alternatively, step S2 may determine whether the shift position lies in the P position or the neutral position and whether or not the side brake is being operated. By detecting that the shift position of the transmission of the vehicle lies in the P position or the N position, or that the side brake is being operated for determining that the vehicle stops running, it is possible to detect that the vehicle is not merely temporarily stopped, thereby preventing the vehicle from running forward or backward during a turning operation.

Further, since the foregoing embodiment has been described for a front wheel drive vehicle, the rear wheels are pivoted into the internally inclined attitude in the turn mode. For a rear wheel drive vehicle, on the other hand, front wheels are pivoted into a similar internally inclined attitude. In the latter case, the front wheels are fixed at predetermined angular positions along tangential directions of an arc having the center located in a central portion of the rotating axle between the rear wheels.

Also, while in the foregoing embodiment, each of the rear wheels is provided with the separate motor 17 or 18, the motors may be formed in the respective rear wheels.

Figure 12:
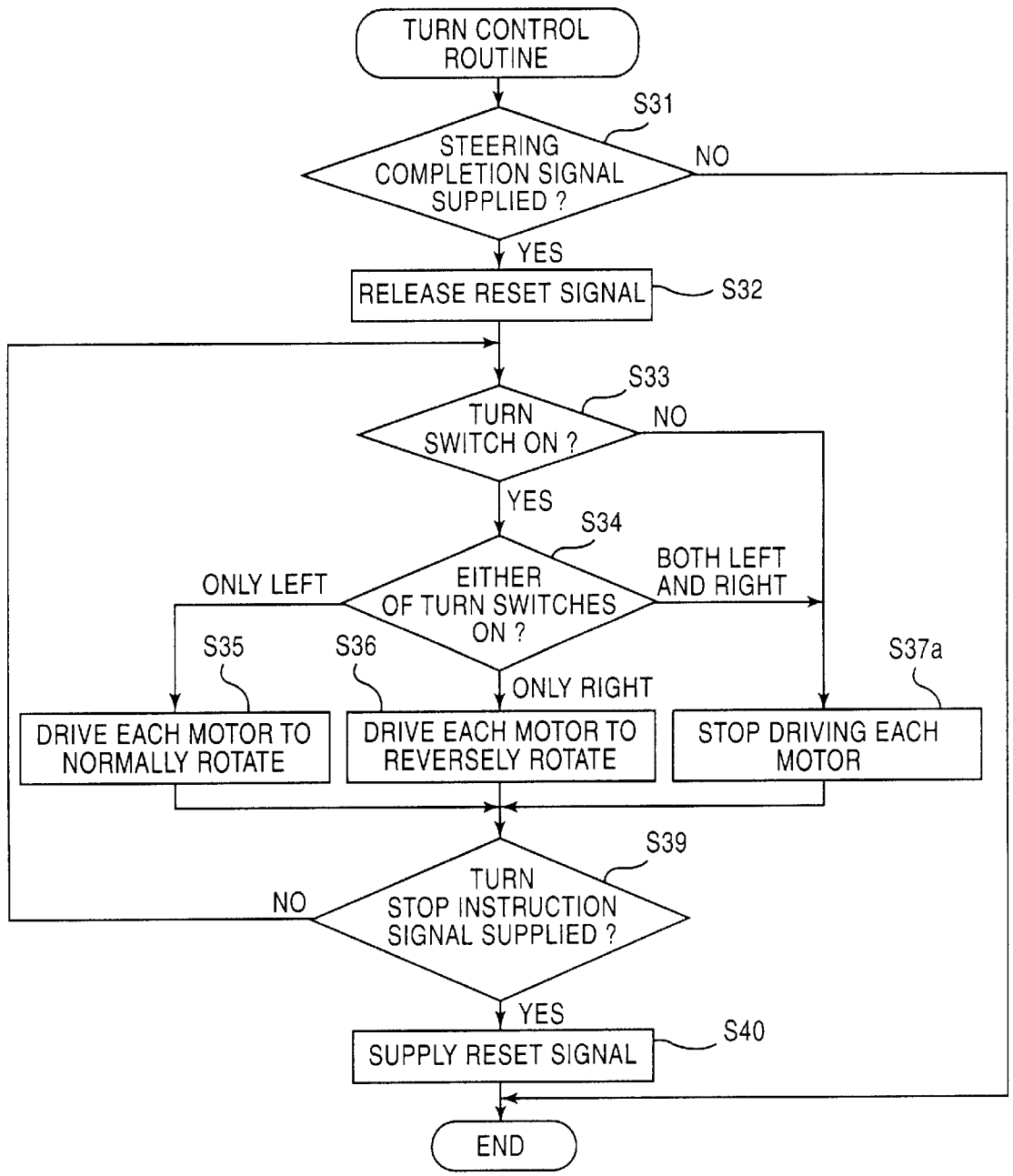
FIG. 12 is a flow chart illustrating another example of a turn control routine.

While the aforementioned turn control routine has been described in connection with a vehicle equipped with the manual brake switch 76, the brake switch 76 may be omitted. In this configuration, as illustrated in FIG. 12, the turn controller 70 may proceed to step S37*a* to stop supplying the motors 17, 18 with a current by stopping driving the motors 17, 18 when the left and right turn switches 74, 75 are determined to be both OFF at step S33 or when the left and right turn switches 74, 75 are both ON at step S34. In other words, the driving of the motors 17, 18 is stopped to stop the vehicle by running resistance. Further, in this event, the vehicle is braked during a turning operation in response to the driver stepping on the brake pedal in order to stop the vehicle at a desired position.

Also, the brake switch 76 may be turned ON associated with the driver stepping on the brake pedal, in which case, the brake switch 76 turns ON in response to the driver stepping on the brake pedal, causing the turn control routine to proceed to step S37, where the rotation of the motors 17, 18 are braked, as illustrated in FIG. 9.

Furthermore, the motors 17, 18 may be applied with a slight current when the driver is stepping on the brake pedal in order to stop turning the vehicle. This application of a slight current is performed for implementing subtle braking by means of the brake pedal by applying a torque such as a creep torque of an automatic transmission during the turn stopping control.

Also, while the foregoing embodiment defines, as the predetermined conditions, the vehicle remaining in a stationary state and the steering angle of the front wheels substantially at 0, the predetermined conditions may additionally include the brake pedal stepped on by the driver.

Further, in the foregoing embodiment, the rear wheels 15, 16 are driven by the motors 17, 18, used as driving sources, for rotation to turn the vehicle body 1. Alternatively, the front wheels 4, 5, which are applied with a running torque by the engine body 2 in the normal mode, may be applied with rotating torques in rotating directions different from each other to turn the vehicle body 1 in the turn mode. In the following, description will be made on a four-wheel vehicle which applies the front wheels 4, 5 respectively with rotating torques in rotating directions different from each other to turn the vehicle body 1.

Figure 13:
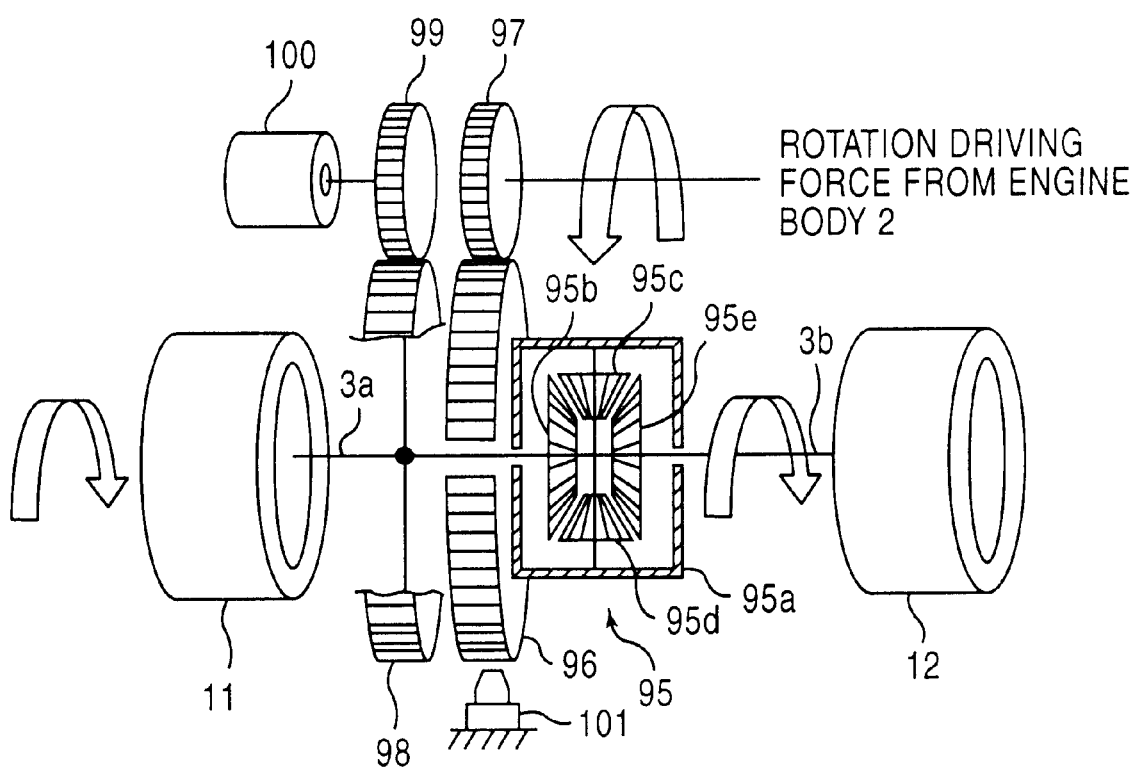
FIG. 13 is a diagram generally illustrating a front wheel driving mechanism.

As illustrated in FIG. 13, the aforementioned driving axle 3 is composed of driving axles 3*a*, 3*b* which are provided with a differential 95. A ring gear 96 fixed to the case 95*a* of the differential 95 meshes with a driving gear 97 which is driven by an engine body 2 to rotate. A stopper 101 is engageable with teeth of the ring gear 96 by a mechanism, not shown, such that the rotation of the ring gear 96 is forcedly stopped when the stopper 101 engages with the ring gear 96. The stopper 101 is driven by a stopper driving unit 102, illustrated in FIG. 14 later described, to engage with the ring gear 96.

A gear 98 is also attached to the driving axle 3*a* so as to rotate with the driving axle 3*a*. The gear 98 meshes with the driving gear 99. The driving gear 99 is driven by a motor 100 to rotate. The motor 100, which serves as a driving source for turning the vehicle body 1, is normally rotated for turning the vehicle body 1 counterclockwise, and is reversely rotated for turning the vehicle body 1 clockwise.

It should be noted that since each of the rear wheels 15, 16 is not applied with a rotating torque in the turn mode, the motors 17, 18 illustrated in FIG. 1 are not provided.

Figure 14:
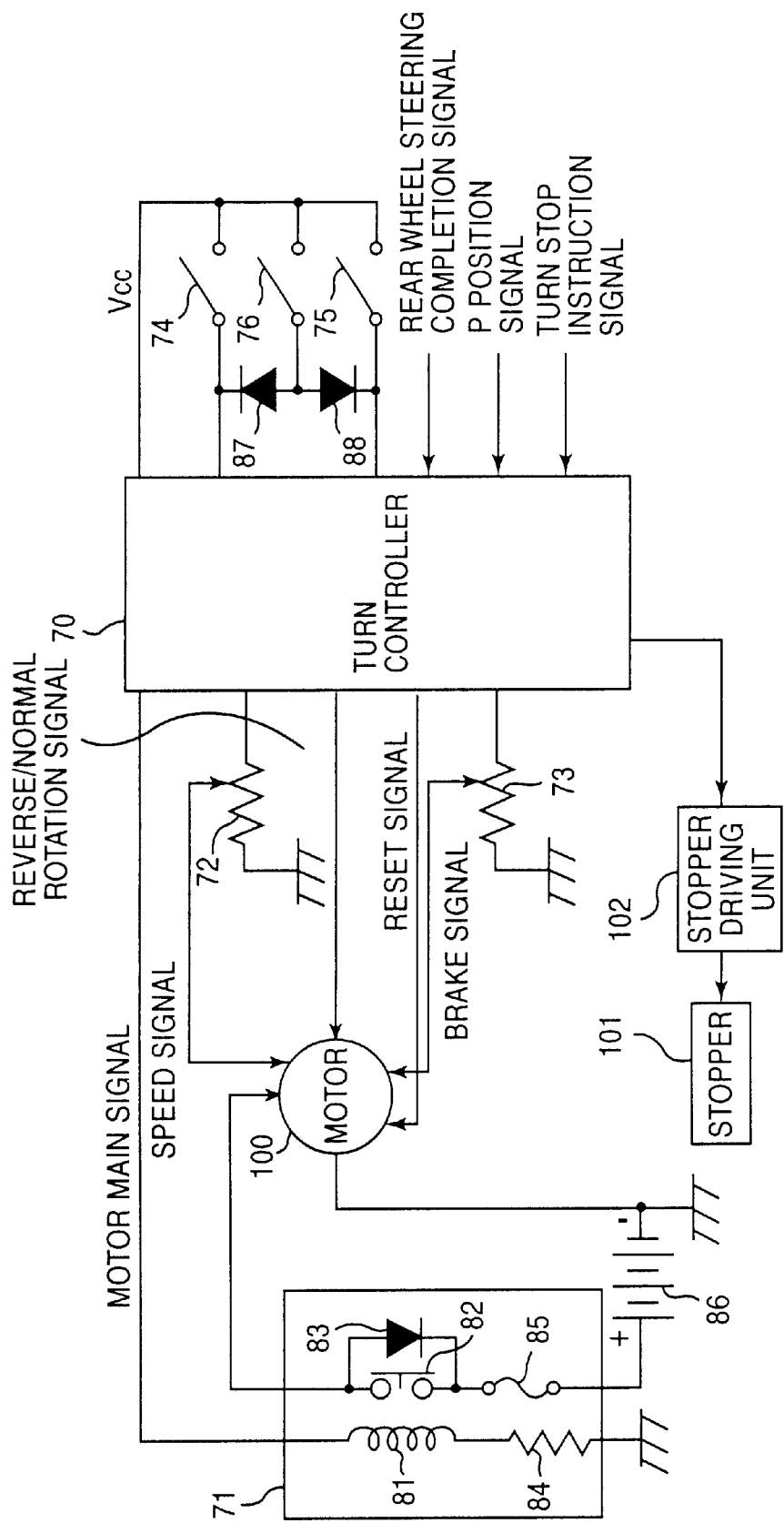
FIG. 14 is a circuit diagram illustrating a driving control system.

The turn controller 70 executes a turn control routine which however differs from the turn control routine illustrated in FIG. 18 in that it controls the driving of the motor 100 as well as the stopper 101. The turn controller 70 is connected to the stopper 101 through a stopper driving unit 102, as illustrated in FIG. 14.

Figure 15:
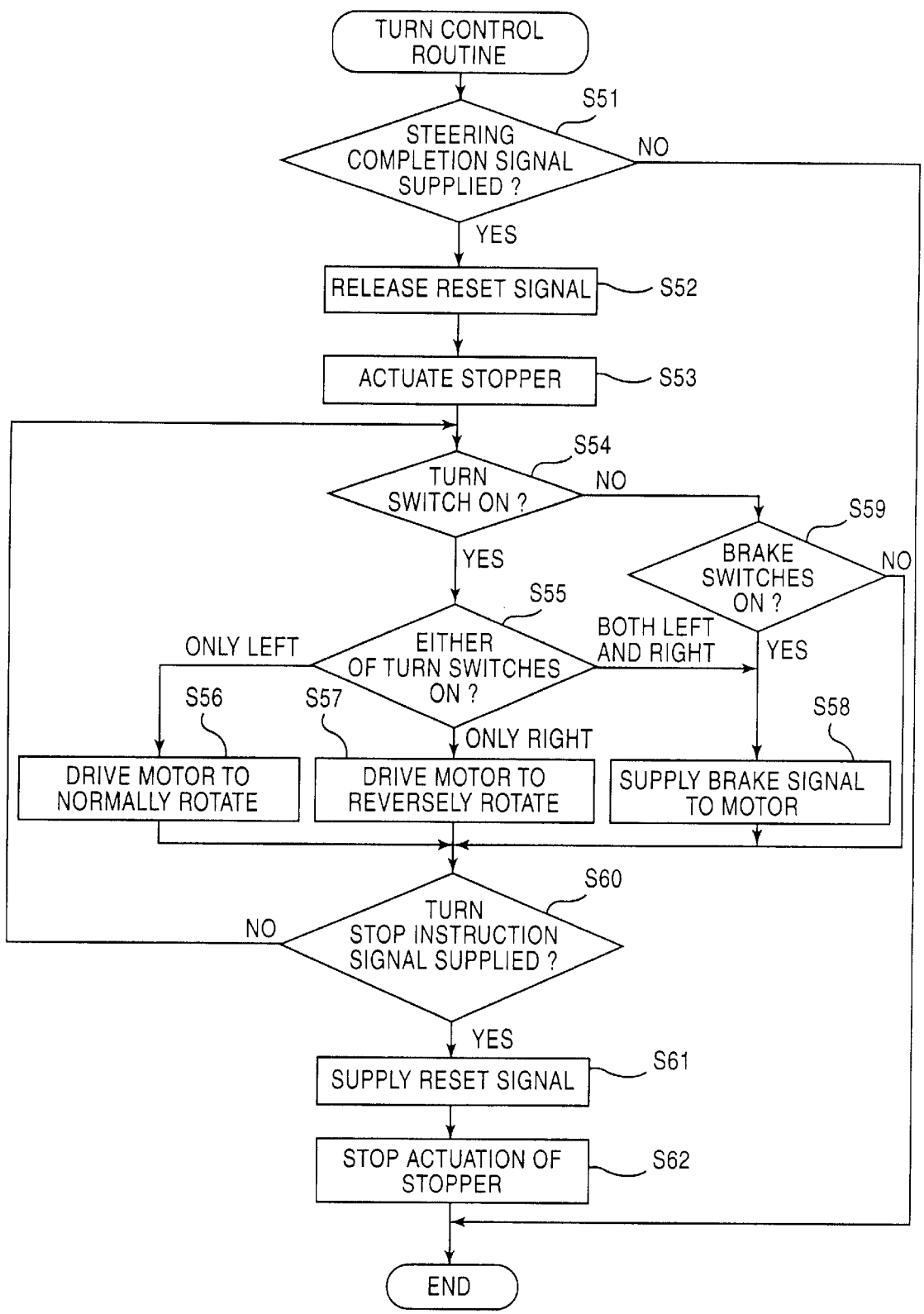
FIG. 15 is a flow chart illustrating another example of a turn control routine.

In the turn control routine as illustrated in FIG. 15, the turn controller 70 determines whether or not a steering completion signal has been generated (step S21). This is identical to step S31 in FIG. 9. Upon receipt of the steering completion signal, the turn controller 70 releases the reset signal (step S52), and actuates the stopper 101 through the stopper driving unit 102 (step S53). Since the motor 100 is normally supplied with the reset signal from the turn controller 70 and therefore disabled to rotate, the reset signal supplied to the motor 100 is stopped to bring the motor 100 into a motor operation waiting state. Also, the stopper 101, when actuated, engages with the ring gear 96 to be fixed together with the case 95a so as to prevent the ring gear 96 from rotating.

After executing the step S53, the turn controller 70 determines whether or not the turn switches are ON (step S54). When at least one of the left and right turn switches 74, 75 is ON, the turn controller 70 determines which of the turn switches 74, 75 is ON (step S55). Steps S54, S55 are identical to steps S23, S24 in FIG. 9. The turn controller 70 drives the motor 100 to normally rotate when the left turn switch 74 alone is ON (step S56); drives the motor 100 to reversely rotate when the right turn switch 75 alone is ON (step 57); and supplies the motor 100 with a brake signal when both the left and right turn switches 74, 75 are ON (step S58). When both the left and right turn switches 74, 75 are OFF, the turn controller 70 determines whether or not the brake switch 76 is ON (step S59). This is identical to step S28 in FIG. 9. When the brake switch 76 is ON, the turn control routine proceeds to step S58 where a brake signal is supplied to the motor 100.

Figure 16:
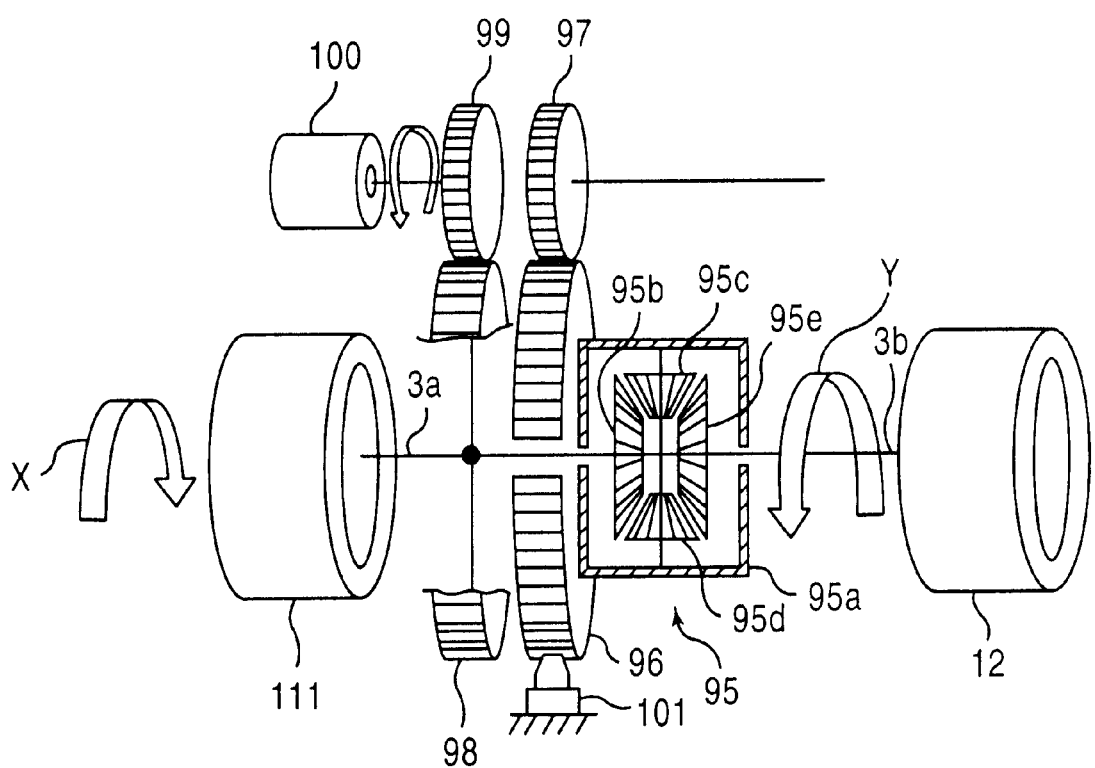
FIG. 16 is a diagram generally illustrating the state of the front wheel driving mechanism during a turning operation.

When the operations at steps S54 to S59 indicate that the left turn switch 74 is manipulated to turn ON, the turn controller 70 supplies the motor 100 with a normal/reverse rotation signal for specifying normal rotation, causing the motor 100 to normally rotate in response to the normal/reverse rotation signal. Since the normal rotation of the motor 100 is transmitted to the driving axle 3a through the driving gear 99 and the gear 98, the driving axle 3a is rotated to rotate the left front wheel 4 as indicated by an arrow X in FIG. 16. In addition, the rotation of the driving axle 3a causes one side gear 95b within the differential 95 to rotate. The rotation of the side gear 95b is transmitted to the other side gear 95e after converted to reverse rotation by two pinions 95c, 95d. In this way, the other side gear 95e reversely rotates the right wheel 5 through the driving axle 3b as indicated by an arrow Y in FIG. 16 in the direction opposite to the rotating direction of the left wheel 4. Thus, the left front wheel 4 is rotated in the direction in which the vehicle goes forward, while the right front wheel 5 is rotated in the direction in which the vehicle goes backward, so that the vehicle body 1 turns to left on the center which is located at the center of the rotating axle of the front wheels 4, 5 (indicated by reference letter B in FIG. 1), causing the rotatable rear wheels 15, 16 to rotate pursuant to the vehicle body turning counterclockwise.

On the other hand, when the right turn switch 75 is manipulated to turn ON, the turn controller 70 supplies the motor 100 with a normal/reverse rotation signal for specifying reverse rotation, causing the motor 100 to reversely rotate in response to the normal/reverse rotation signal. Since the reverse rotation of the motor 100 is transmitted to the driving axle 3a through the driving gear 99 and the gear 98, the driving axle 3a is rotated to rotate the left front wheel 4 in the direction reverse to that indicated by the arrow X in FIG. 16. In addition, the rotation of the driving axle 3a causes one side gear 95b within the differential 95 to rotate. The rotation of the side gear 95b is transmitted to the other side gear 95e after converted to reverse rotation by the two pinions 95c, 95d. In this way, the other side gear 95e rotates the right wheel 5 through the driving axle 3b in the direction reverse to that indicated by the arrow Y in FIG. 16. Thus, the left front wheel 4 is rotated in the direction in which the vehicle goes backward, while the right front wheel 5 is rotated in the direction in which the vehicle goes forward, so that the vehicle body 1 turns clockwise on the center which is located at the center of the rotating axle of the front wheels 4, 5 (indicated by reference letter B in FIG. 1), causing the rotatable rear wheels 15, 16 to rotate pursuant to the vehicle body turning clockwise.

As the brake switch 76 is manipulated to turn ON, the turn controller 70 supplies the motor 100 with a brake signal, to brake the rotation of the motor 100. Likewise, when the left turn switch 74 and the right turn switch 75 are both manipulated to turn ON, the motor 100 is supplied with a brake signal to brake the motor 100.

Upon driving the motor 100 to normally or reversely rotate, as described above, the turn controller 70 supplies a motor main signal to the relay unit 71. In the relay unit 71, the relay coil 81 is excited in response to the motor main signal to turn the relay switch 83 ON. The relay switch 83 thus turned ON lets a current flow from the positive terminal of the battery 86, through the fuse 85, the relay switch 83, the motor 100, into the negative terminal of the battery 86. In this way, the motor 100 is applied with an output voltage of the battery 86 to produce normal rotation or reverse rotation thereof.

After executing step S57, S58 or S59, the turn controller 70 determines whether or not the turn stop instruction signal has been supplied thereto (step S60). This is identical to step S29 in FIG. 9. As the mode switch 61 is manipulated to turn OFF to cause the rear wheel steering angle controller 60 to generate the turn stop instruction signal at the aforementioned step S12, the turn stop instruction signal is supplied to the turn controller 70. If no turn stop instruction signal is supplied, the turn controller 70 returns to step S54 to repeat the foregoing operations. On the other hand, the turn stop instruction signal, if supplied, terminates the turning operation of the vehicle, so that the turn controller 70 supplies the reset signal to the motor 100 (step S61), and stops the actuation of the stopper 101 by means of the stopper driving unit 102 (step S62), followed by the termination of this routine. The reset signal supplied to the motor 100 results in locking the motors 100 which is thus set into a rotation disabled state. In addition, as the stopper 101 is stopped operating, the ring gear 96 is released from the engagement with the stopper 101, so that the ring gear 96 is made rotatable with the case 95a by the rotation of the driving gear 97.

In the respective embodiments described above, the left and right wheels are simultaneously pushed by way of a pair of cylinders. Alternatively, the left and right wheels may be individually driven, or may be applied with a driving force in a lateral direction of the vehicle. For example, the left and right knuckle arms 24b, 36b may be directly pushed without intervention of the rim 45 and the arms 32, 40, respectively. Further alternatively, the driving force may be applied in a variety of ways such as by use of a differential rack.

As described above, according to the four-wheel vehicle of the present invention, since one of front and rear pairs of left and right wheels, to which a running torque produced by a driving source is not transmitted, are supported for rotation concerning the respective axes perpendicular to the ground, and the one pair of left and right wheels are rotated from the straight traveling positions taken when the vehicle is running to the respective angular positions along the tangential directions of the arc passing the respective axes perpendicular to the ground of the one pair of left and right wheels, with the center of the arc located near the center point of the rotating axle of the other of the front and rear pairs of left and right wheels, it is possible to provide a relatively simple and small turning mechanism. In addition, since the one pair of left and right wheels will not be rotated from the straight traveling positions taken when the vehicle is running to the respective angular positions along the tangential directions for a turning operation unless the vehicle operating state satisfies the predetermined conditions suitable for a turn when a turn mode instruction is generated, the turning operation can be performed while the vehicle is in a stable state.

Further, since one or the other pair of left and right wheels are applied with a rotating torque at angular positions along tangential directions to turn the vehicle body on a neighborhood of the center point of the rotating axle for running the vehicle of the other pair of left and right wheels, the turning radius is extremely small. Thus, the four-wheel vehicle according to the foregoing embodiment, because of its ability of making a small and sharp turn, facilitates the driving which involves a turning operation of the vehicle such as column parking, entry into a garage, U-turn, and so on.

Figure 17:
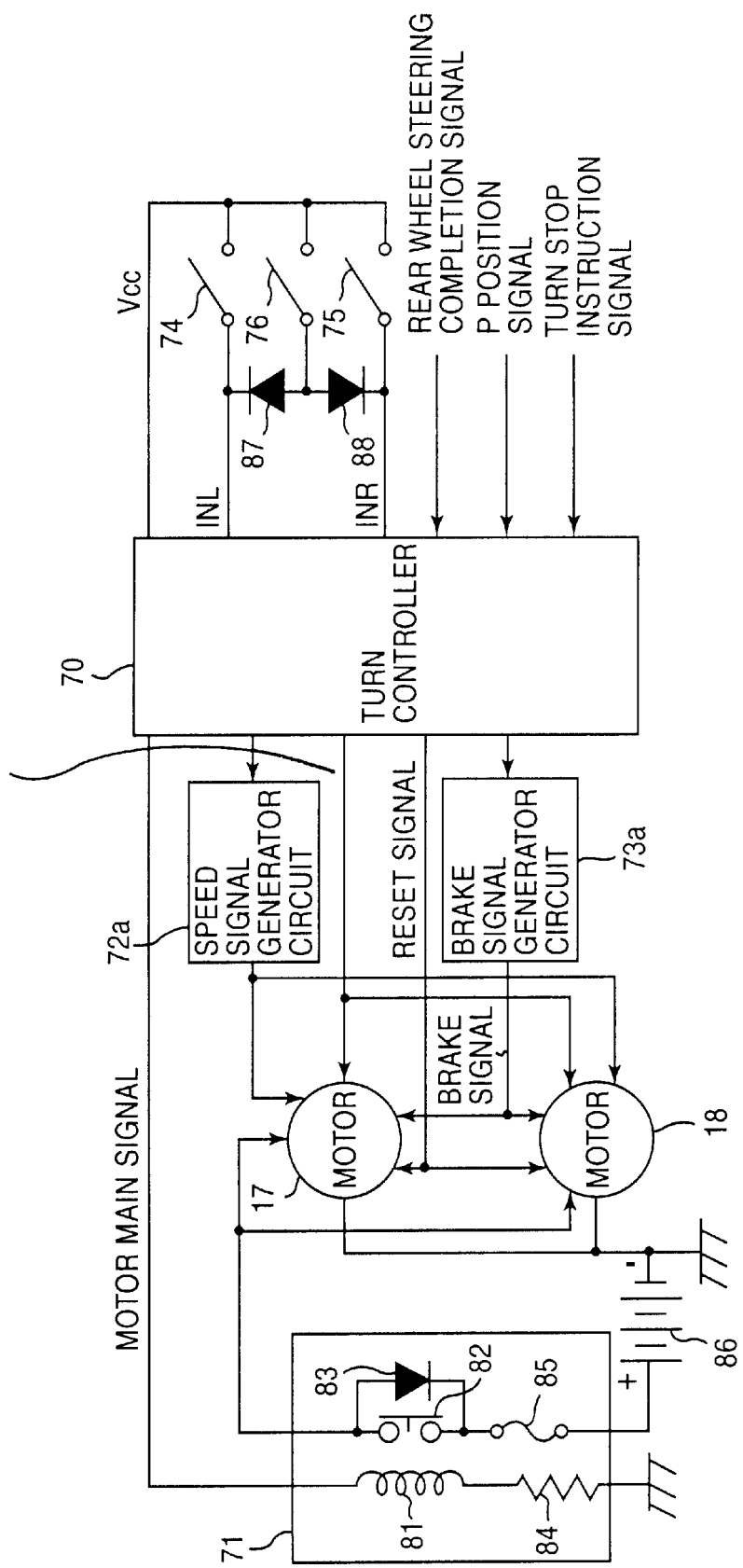
FIG. 17 is a circuit diagram illustrating a driving control system.

FIG. 17 illustrates a driving control system for the motors 17, 18 as another embodiment of the present invention. Explaining different features between the driving control systems of FIG. 5 and FIG. 17, the driving control system of FIG. 17 comprises a speed signal generator circuit 72a and a brake signal generator circuit 73a instead of the speed adjusting volume 72 and the brake adjusting volume 73 in FIG. 5, respectively. The speed signal generator circuit 72a may include, for example, a time constant circuit, and generates a speed signal which rises with a slope defined by a predetermined time constant in response to a control signal from the turn controller 70, and supplies the speed signal to the motors 17, 18. A brake signal is generated by the brake signal generator circuit 73a. Similar to the speed signal generator circuit 72a, the brake signal generator circuit 73a may include, for example, a time constant circuit, and generates a brake signal which rises with a slope defined by a predetermined time constant in response to a control signal from the turn controller 70, and supplies the brake signal to the motors 17, 18.

The remaining configuration of the driving control system in FIG. 17 are identical to those of the driving control system illustrated in FIG. 5.

It should be noted that the mode switch 61, the turn switches 74, 75 and the brake switch 76 are positioned in the vehicle as illustrated in FIG. 6.

The rear wheel steering angle controller 60 executes the rear wheel steering routine illustrated in FIG. 7, while the turn controller 70 executes the turn control routine illustrated in FIG. 9.

Figure 18A:
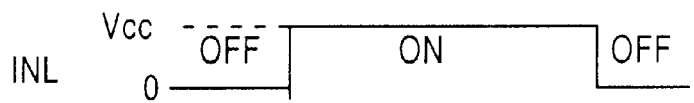
FIGS. 18A and 18B are waveform charts illustrating the relationship between a turn switch and a speed signal level.
Figure 18B:
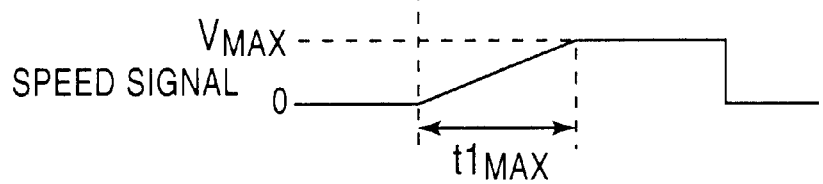

As the left turn switch 74 is manipulated for driving the motors 17, 18 to normally rotate, the level at the input terminal INL of the turn controller 70 from the left turn switch 74 transitions to high level at a voltage Vcc as illustrated in FIG. 18A. The high level is maintained during a period in which the left turn switch 74 is kept ON. As the level at the input terminal INL transitions to high level, the turn controller 70 instructs the speed signal generator circuit 72a to generate a speed signal. In response, the speed signal generator circuit 72a generates the speed signal as illustrated in FIG. 18B. Specifically, the speed signal has a level which gradually increases as defined by a predetermined time constant until a predetermined time $t1_{MAX}$ is elapsed. As the level of the speed signal reaches a predetermined voltage $V_{MAX}$ (for example, 5 volts) after the predetermined time $t1_{MAX}$, the predetermined voltage $V_{MAX}$ is maintained. When the left turn switch 74 is turned OFF, the turn controller 70 instructs the speed signal generator circuit 72a to stop generating the speed signal, thereby causing the speed signal generator circuit 72a to stop generating the speed signal. The operations involved in generating the speed signal are similar when the right turn switch 75 is turned ON, causing the level of the input terminal INR of the turn controller 70 from the right turn switch 75 to transition to high level.

As the motors 17, 18 are supplied with the speed signal having the rising characteristic as described above, a voltage applied to the motors 17, 18 gradually increases in accordance with the level of the speed signal. In other words, the rotating speed of the motors 17, 18 is gradually accelerated from the time the left or right turn switch 74 or 75 is turned ON, thereby starting slowly turning the vehicle body 1 counterclockwise or clockwise.

Figure 19A:
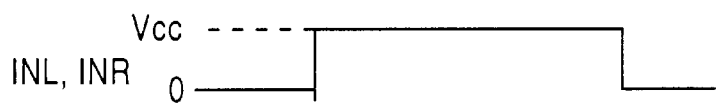
FIGS. 19A and 19B are waveform charts illustrating the relationship between a brake switch and a brake signal level.
Figure 19B:
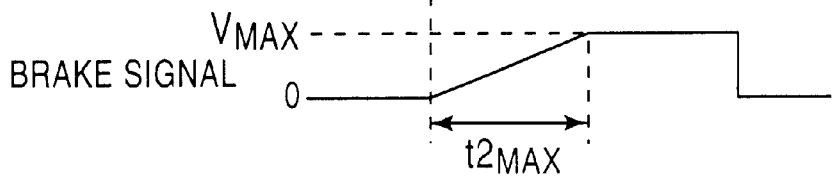

As the brake switch 76 is turned ON, the levels at the respective input terminals INL, INR of the turn controller 70 from the left and right turn switches 74, 75 transition to high level at the voltage Vcc as illustrated in FIG. 19A, with the high level maintained for a period in which the brake switch 76 remains ON. As the levels at the input terminals INL, INR transition to high level, the turn controller 70 instructs the brake signal generator circuit 73a to generate a brake signal. In response, the brake signal generator circuit 73a generates the brake signal, as illustrated in FIG. 19B, the level of which gradually increases as defined by a predetermined time constant until the predetermined time $t1_{MAX}$ is elapsed. When the level of the brake signal reaches the predetermined voltage $V_{MAX}$ after the predetermined time $t1_{MAX}$, the predetermined voltage $V_{MAX}$ is maintained. As the brake switch 76 is turned OFF, the turn controller 70 instructs the brake signal generator circuit 73a to stop generating the brake signal, thereby causing the brake signal generator circuit 73a to stop generating the brake signal.

Figure 20:
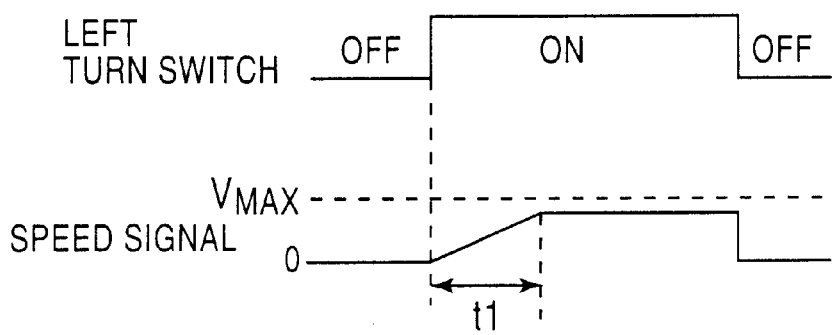
FIG. 20 is a waveform chart of a speed signal when the speed signal level is limited.

As the motors 17, 18 are supplied with the brake signal which has the rising characteristic as described above, a braking action applied to the motors 17, 18 gradually increases. It should be noted that the levels of the speed signal and the brake signal may be limited to certain voltages lower than the predetermined voltage $V_{MAX}$. For example, as illustrated in FIG. 20, the speed signal may be such that its level gradually increases as defined by the predetermined time constant from the turning ON of the left turn switch 74 until the lapse of a time t1 shorter than the predetermined time $t1_{MAX}$, and is subsequently maintained at the voltage (the voltage lower than the predetermined voltage $V_{MAX}$) which is generated when the time t1 is elapsed.

Figure 21:
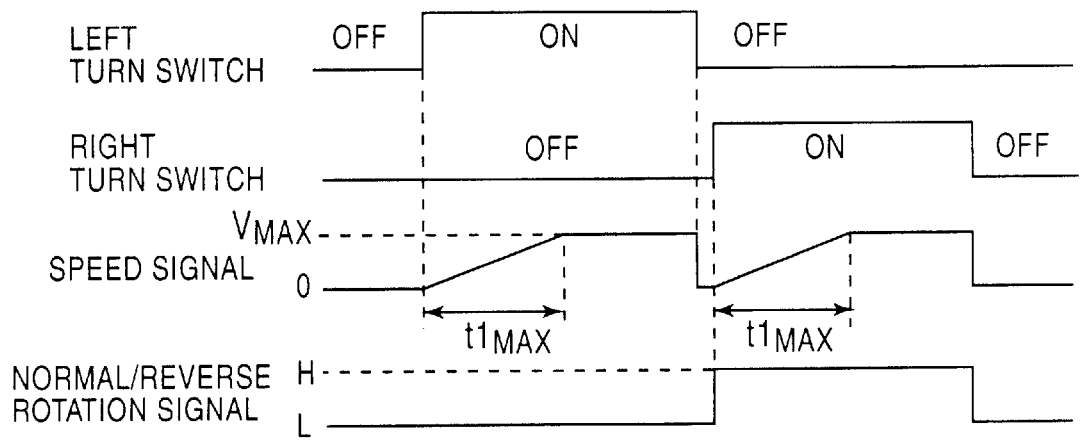
FIG. 21 illustrates waveform charts of a speed signal and a normal/reverse rotation signal when ON periods of respective left and right turn switches do not overlap with each other.

FIG. 21 illustrates the waveforms of the speed signal and a normal/reverse rotation signal which are generated when the left turn switch 74 is turned ON, and immediately after that, the left turn switch 74 is turned OFF and the right turn switch 75 is turned ON. Specifically, the speed signal generated from the speed signal generator circuit 72a has the level which gradually increases from the time the left turn switch 74 is turned ON, and reaches a predetermined voltage. In this event, since the normal/reverse rotation signal is at low level, the vehicle body 1 is turned counterclockwise with the left turning speed being gradually increased to a predetermined speed. As the driver turns ON the right turn switch 75 immediately after he turns OFF the left turn switch 74, the level of the normal/reverse rotation signal transitions to high level simultaneously with the turning ON of the right turn switch 75. The level of the speed signal gradually increases from the time the right turn switch 75 is turned ON, and reaches a predetermined voltage. Consequently, the vehicle body 1 is turned clockwise, with the clockwise turning speed being gradually increased to a predetermined speed. Subsequently, as the right turn switch 75 is turned OFF, the speed signal so far generated is stopped, while the level of the normal/reverse rotation signal returns to low level.

Figure 22:
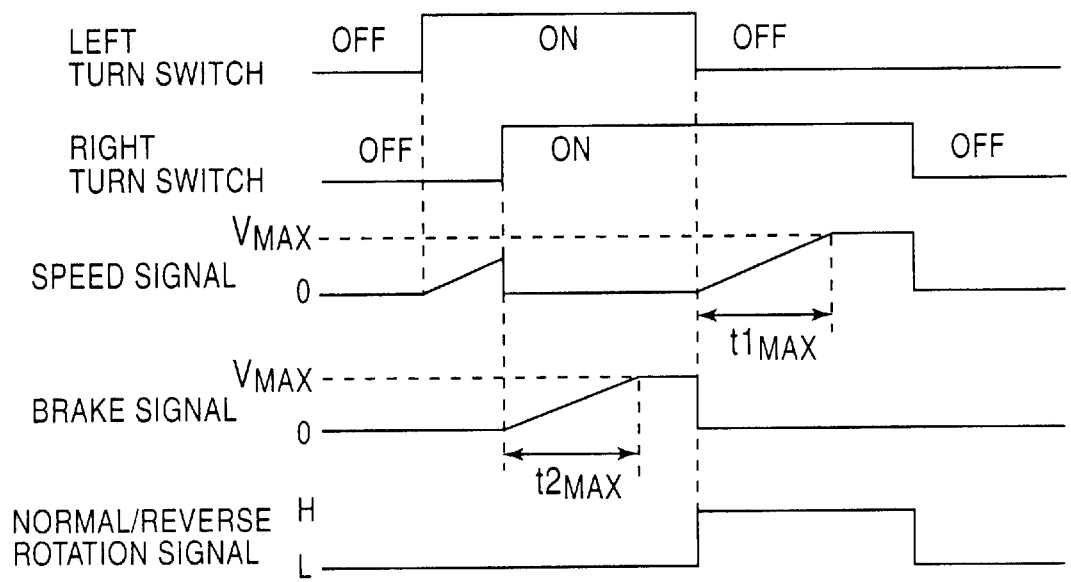
FIG. 22 illustrates waveform charts of a speed signal and a normal/reverse rotation signal when ON periods of respective left and right turn switches overlap with each other.

FIG. 22 illustrates the waveforms of the speed signal and the normal/reverse rotation signal which are generated when the left turn switch 74 is turned ON, and then the right turn switch 75 as well as the left turn switch 74 are turned ON, followed by turning OFF the left turn switch 74. Specifically, the speed signal generated from the speed signal generator circuit 72a gradually increases from the time the left turn switch 74 is turned ON, and the normal/reverse rotation signal is at low level, so that the vehicle body 1 is turned counterclockwise, with the counterclockwise turning speed being gradually increased. However, since a braking force is applied by turning ON the right turn switch 75 before the level of the speed signal reaches a predetermined voltage, the level of the speed signal immediately falls down to zero. During a period in which the left and right turn switches 74, 75 are both ON, the level of the brake signal gradually increases from the time the right turn switch 75 is turned ON, and reaches the predetermined voltage. This causes a braking force to gradually act on the vehicle body 1 which is being turned counterclockwise. Subsequently, as the driver turns OFF the left turn switch 74 with the right turn switch 75 maintained ON, the level of the normal/reverse rotation signal transitions to high level simultaneously with the turning OFF of the left turn switch 74, causing the level of the speed signal to gradually increase to the predetermined voltage. Consequently, the vehicle body 1 is turned clockwise, with the clockwise turning speed being gradually increased to a predetermined speed. Then, as the right turn switch 75 is turned OFF, the speed signal so far generated is stopped, while the level of the normal/reverse rotation signal returns to low level.

In the foregoing embodiment, the feature for engaging the knuckle 24 with the trailing arm 30 constitutes a rotatably supporting device which supports one pair of the left and right wheels rotatable on respective axes perpendicular to the ground, while the feature composed of the hydraulic cylinders 41, 42, the rods 43, 44, the oil tank 51, the pump 52, the motor 53, the electromagnetic valve 54, the rims 45, 46, and the connecting arms 32, 40 constitutes a rotation driving device. The left and right turn switches 74, 75 correspond to a turn instructing device, and the turn controller 70, the relay unit 71, the speed signal generator circuit 72a and the battery 86 correspond to a voltage applying device.

Figure 23:
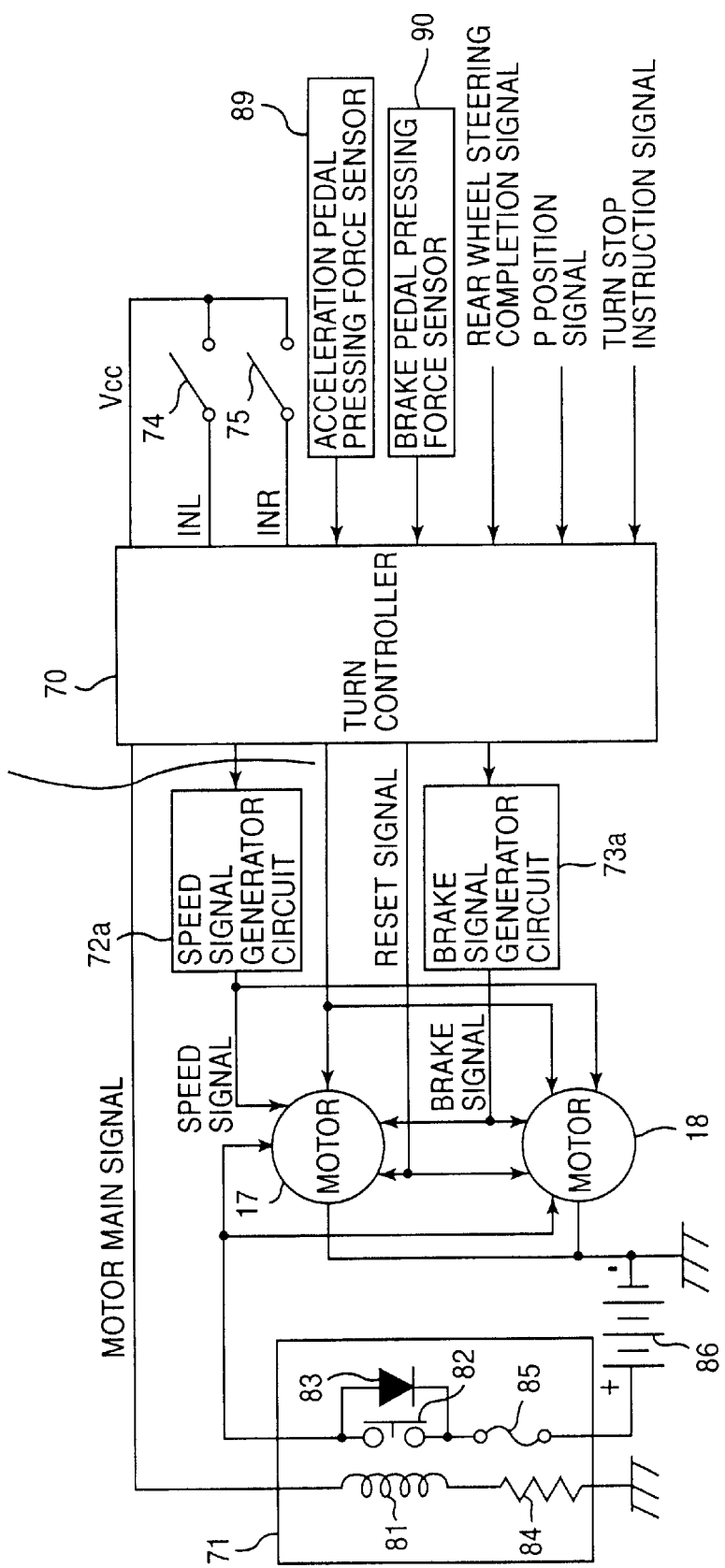
FIG. 23 is a circuit diagram illustrating another example of a driving control system.

Further, as illustrated in FIG. 23, the four-wheel vehicle according to the present invention may comprise a acceleration pedal pressing force sensor 89 for detecting the amount of pressing force applied on an acceleration pedal (not shown) of the vehicle to generate an output signal having a level corresponding to the detected amount of pressing force; and a brake pedal pressing force sensor 90 for detecting the amount of pressing force applied to a brake pedal of the vehicle to generate an output signal having a level corresponding to the detected amount of pressing force, such that the level of the speed signal is adjusted in accordance with the output signal of the acceleration pedal pressing force sensor 89, and the level of the brake signal is adjusted in accordance with the output signal of the brake pedal pressing force sensor 90. In this configuration, turning the vehicle counterclockwise or clockwise may be switched with the left and right turn switches 74, 75 which are turned ON/OFF associated with a manipulation to the shift lever 80 illustrated in FIG. 10.

Figure 24:
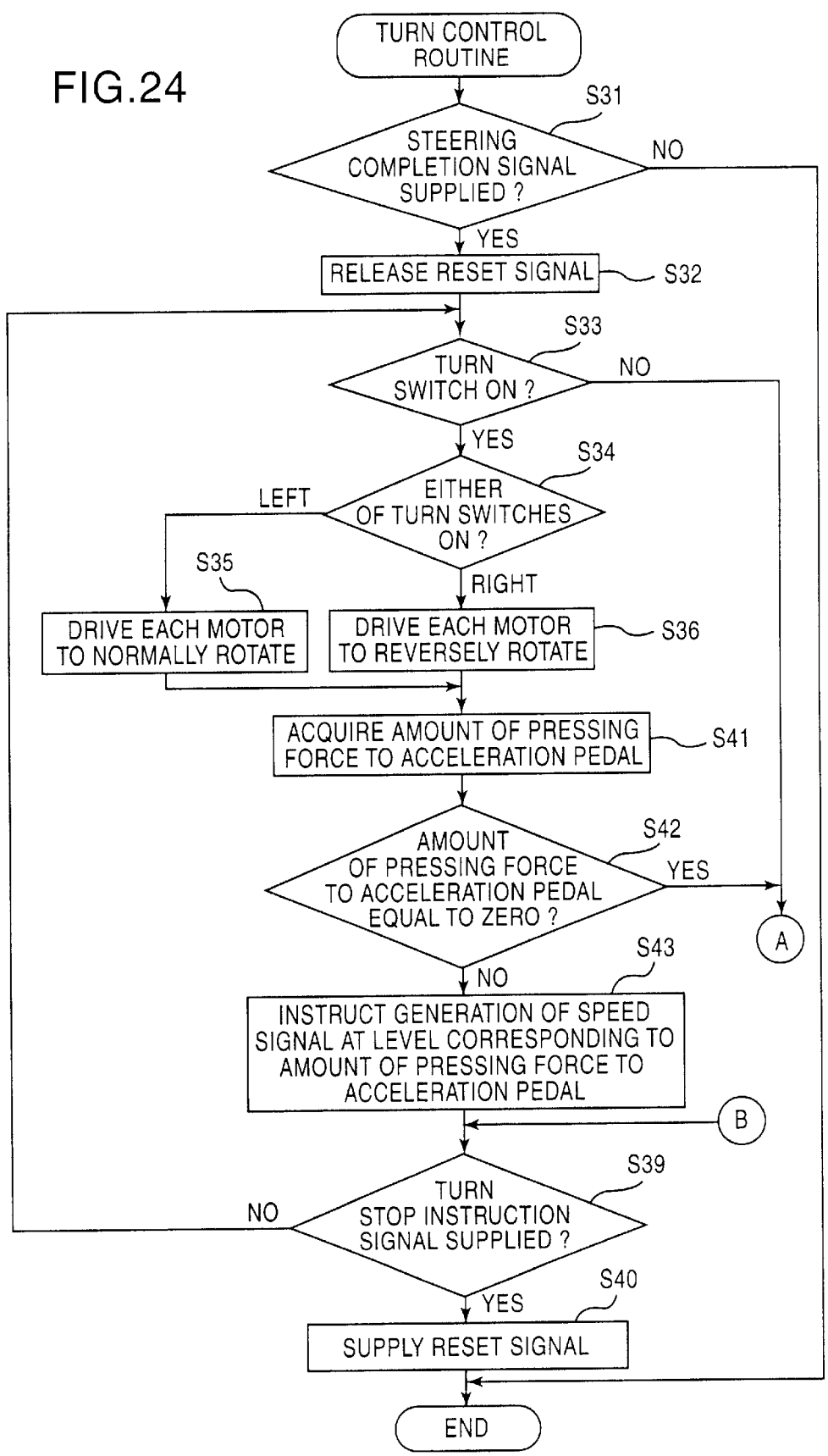
FIG. 24 is a flow chart illustrating another example of a turn control routine.
Figure 25:
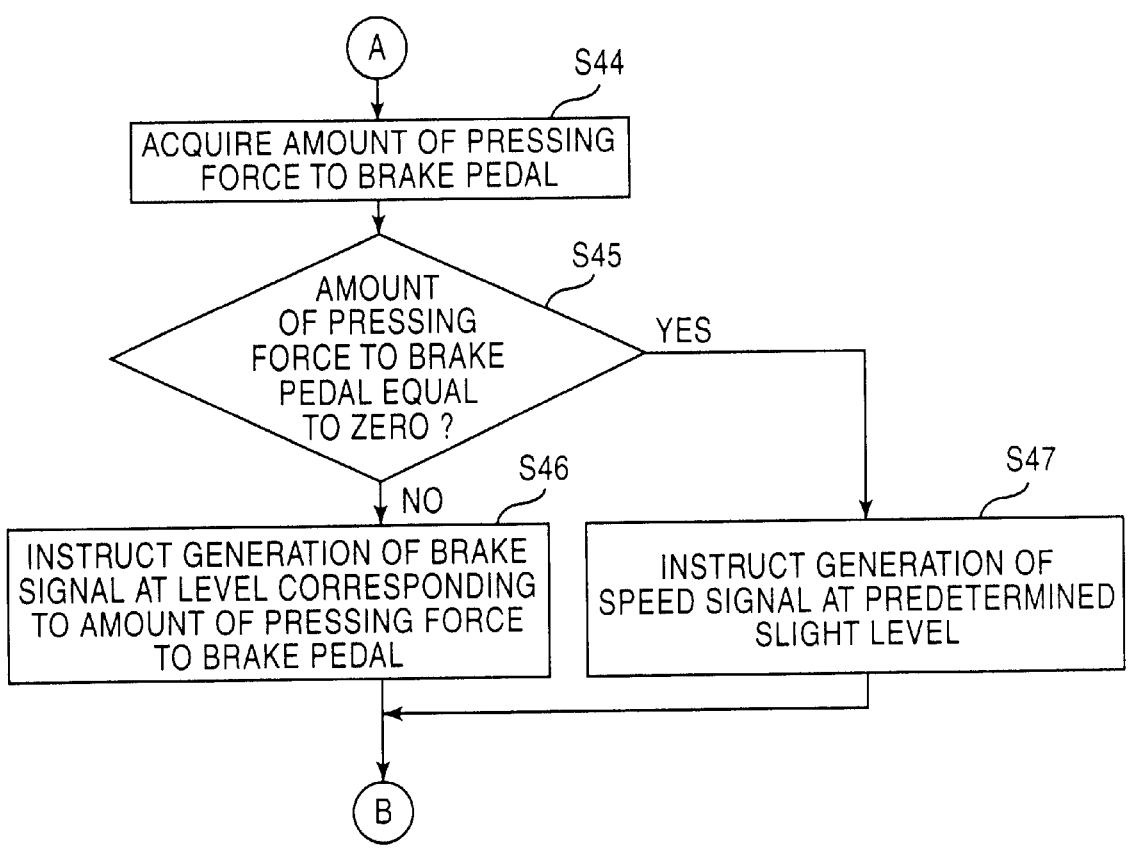
FIG. 25 is a flow chart illustrating steps subsequent to the turn control routine of FIG. 24.

In a turn control routine illustrated in FIGS. 24 and 25, the turn controller 70 in FIG. 23 proceeds to step S35, when determining at step S34 that the left turn switch 74 is ON, to normally rotate the motors 17, 18. On the other hand, when determining at step S34 that the right turn switch 75 is ON, the turn controller 70 proceeds to step S36 to reversely rotate the motors 17, 18. After executing step S35 or S36, the turn controller 70 proceeds to step S41. At step S41, the turn controller 70 acquires the amount of pressing force applied to the acceleration pedal from the acceleration pedal pressing force sensor 89. Then, the turn controller 70 determines whether or not the amount of pressing force applied to the acceleration pedal is zero (step S42). If any pressing force is applied to the acceleration pedal, the turn controller 70 instructs the speed signal generator circuit 72a to generate a speed signal at a level corresponding to the amount of the pressing force applied to the acceleration pedal (step S43).

When determining at step S33 that the left and right turn switches 74, 75 are both OFF, the turn controller 70 acquires the amount of pressing force applied to the brake pedal from the brake pedal pressing force sensor 90 (step S44), and determines whether or not the amount of pressing force applied to the brake pedal is zero (step S45). When determining at step S42 that the amount of pressing force applied to the acceleration pedal is zero, the turn controller 70 also executes steps S44, S45. If any pressing force is applied to the brake pedal, the turn controller 70 instructs the brake signal generator circuit 73a to generate a brake signal at a level corresponding to the amount of the pressing force applied to the brake pedal (step S46). Thus, the motors 17, 18 are applied with the speed signal at the level corresponding to the amount of pressing force applied to the acceleration pedal to control the rotational speed of the motors 17, 18 when they are normally or reversely rotated, thereby adjusting the turning speed of the vehicle body 1 in accordance with the amount of pressing force applied to the acceleration pedal when the vehicle body 1 is turned counterclockwise or clockwise. Similarly, the motors 17, 18 are applied with the brake signal at the level corresponding to the amount of pressing force applied to the brake pedal to control the braking action to the rotation of the motors 17, 18, thereby adjusting the braking amount to the vehicle body 1, which is to be turned counterclockwise or clockwise, in accordance with the amount of pressing force applied to the brake pedal.

If the amount of pressing force to the acceleration pedal is zero, no speed signal is generated. If the amount of pressing force to the brake pedal is also zero, the turn controller 70 instructs the speed signal generator circuit 72a to generate the speed signal at a predetermined slight level (step S47). The speed signal at the predetermined slight level, when supplied to the motors 17, 18, generates slight driving forces in the motors 17, 18. This application of a slight current is performed for slightly driving the motors 17, 18, when the brake pedal is released, to apply the rear wheels 15, 16 with a torque such as a creep torque of an automatic transmission in order to improve the operability of the vehicle when the driver steps on the brake pedal to decelerate the vehicle.

In response to the driver stepping on the brake pedal, a brake caliper 35 may be brought into contact with a brake disk 33 in the left rear wheel, and a brake caliper may be bought into contact with a brake disk, not shown, likewise in the right rear wheel, to apply a slight current to the motors 17, 18 in response to the driver stepping on the brake pedal for stopping a turning operation, also for braking the rotation of the rear wheels 15, 16.

As described above, according to the present invention, one of front and rear pairs of left and right wheels, to which a running torque produced by a driving source is not transmitted, are supported for rotation concerning the respective axes perpendicular to the ground, and the one pair of left and right wheels are rotated from the straight traveling positions taken when the vehicle is running to the respective angular positions along the tangential directions of the arc passing the respective axes perpendicular to the ground of the one pair of left and right wheels, with the center of the arc located near the center point of the rotating axle for running vehicle of the other of the front and rear pairs of left and right wheels. As a left or right turning instruction is generated in response to a manipulation, the motors are applied with a gradually increasing driving voltage such that the motors apply rotating torques to the one pair of left and right wheels to turn the vehicle body on a neighborhood of the center point of the rotating axle for running the vehicle of the other pair of left and right wheels, so that the turning speed is gradually increased in the counterclockwise or clockwise turning direction. Therefore, the vehicle is prevented from suddenly turning immediately after the left or right turning instruction is generated, thereby allowing the driver to turn the vehicle body to a desired position with a good operability.

Also, in the four-wheel vehicle equipped with a turning mechanism of the present invention, one of front and rear pairs of left and right wheels, to which a running torque produced by a driving source is not transmitted, are supported for rotation concerning the respective axes perpendicular to the ground, and the one pair of left and right wheels are rotated from the straight traveling positions taken when the vehicle is running to the respective angular positions along the tangential directions of the arc passing the respective axes perpendicular to the ground of the one pair of left and right wheels, with the center of the arc located near the center point of the rotating axle for running the vehicle of the other of the front and rear pairs of left and right wheels. The motors are applied with a driving voltage at a level corresponding to the amount of pressing force to the acceleration pedal, which is applied while a turning instruction is being generated, such that the motors apply rotating torques to the one pair of left and right wheels to turn the vehicle body on a neighborhood of the center point of the rotating axle for running the vehicle of the other pair of left and right wheels, causing the turning speed to increase in accordance with the amount of pressing force applied by the driver to the acceleration pedal in the counterclockwise or clockwise turning direction. Thus, the driver can turn the vehicle body without a feeling of physical disorder as compared with a normal running operation, and accordingly turn the vehicle body to a desired position with a good operability.

What is claimed is:

1. A four-wheel vehicle equipped with a turning mechanism comprising:
   a rotatably supporting device for supporting one of front and rear pairs of left and right wheels, to which a running torque produced by a driving source is not transmitted, for rotation concerning respective axes perpendicular to the ground;
   an instructing device for generating a turn mode instruction in response to a manipulation;
   a determining device for determining whether a vehicle operating state satisfies predetermined conditions when said turn mode instruction is generated;
   a rotation driving device, when said determining device determines that said predetermined conditions are satisfied, for rotating the one pair of left and right wheels from straight traveling positions taken when said vehicle is running to respective angular positions along tangential directions of an arc passing said respective axes perpendicular to the ground of said one pair of left and right wheels, said arc having the center located near a center point of a rotating axle for running said vehicle of the other of the front and rear pairs of left and right wheels; and
   a turn driving device for applying a rotating torque to said one pair of left and right wheels at the angular positions along said tangential directions to turn the vehicle body on a neighborhood of the center point of the rotating axle for running said vehicle of the other pair of left and right wheels.

2. A four-wheel vehicle equipped with a turning mechanism according to claim 1, further including:
   a left turn instructing device for generating a left turn instruction in response to a manipulation; and
   a right turn instructing device for generating a right turn instruction in response to a manipulation,
   wherein said turn driving device turns said vehicle body counterclockwise in response to said left turn instruction, and turns said vehicle body clockwise in response to said right turn instruction.

3. A four-wheel vehicle equipped with a turning mechanism according to claim 2, wherein said left turn instructing device and said right turn instructing device are arranged integral with a steering wheel.

4. A four-wheel vehicle equipped with a turning mechanism according to claim 2, further comprising a transmission formed with a left turn shift position and a right turn shift position in addition to shift positions for transmission,
   wherein said left turn instructing device generates said left turn instruction when a shift lever of said transmission is moved to said left turn shift position; and
   said right turn instructing device generates said right turn instruction when the shift lever of said transmission is moved to said right turn shift position.

5. A four-wheel vehicle equipped with a turning mechanism according to claim 1, wherein:
   said instructing device generates a turn mode stop instruction in response to a manipulation; and
   said rotation driving device rotates said one pair of left and right wheels from the angular position along said tangential directions to said straight traveling positions in response to said turn mode stop instruction.

6. A four-wheel vehicle equipped with a turning mechanism according to claim 1, wherein said predetermined conditions include at least the following conditions:
   (a) said vehicle stops running; and
   (b) the steering angle of front wheels is substantially zero degrees.

7. A four-wheel vehicle equipped with a turning mechanism according to claim 6, wherein said condition defining that said vehicle stops running is detected from:
   a shift position of a transmission equipped in said vehicle lying in a P (parking) position or an N (neutral) position; or
   a side brake being in operation.

8. A four-wheel vehicle equipped with a turning mechanism according to claim 2, wherein said turn driving device stops turning said vehicle body when said left turn instruction and said right turn instruction are simultaneously generated.

9. A four-wheel vehicle equipped with a turning mechanism according to claim 1, wherein:

said rotation driving device includes a turn position detecting device for detecting that said one pair of left and right wheels have been rotated from said straight traveling positions to said angular positions along said tangential directions to generate a turn position signal, and said rotation driving device stops rotating said one pair of left and right wheels in response to said turn position signal.

10. A four-wheel vehicle equipped with a turning mechanism according to claim 5, wherein:

said rotation driving device includes a straight traveling position detecting device for detecting that said one pair of left and right wheels have been rotated from said angular positions along said tangential directions to said straight traveling positions to generate a straight traveling position signal, and said rotation driving device stops rotating said one pair of left and right wheels in response to said straight traveling position signal.

11. A four-wheel vehicle equipped with a turning mechanism according to claim 1, further comprising a shift lock mechanism for disabling a transmission to perform a shifting operation when at least said one pair of left and right wheels are at positions other than said straight traveling positions.

12. A four-wheel vehicle equipped with a turning mechanism according to claim 1, wherein said turn driving device applies said rotating torque to said one pair of left and right wheels with a driving source different from said driving source for running said vehicle.

13. A four-wheel vehicle equipped with a turning mechanism according to claim 1, wherein said rotatably supporting device includes a trailing arm for rotatably supporting said one pair of left and right wheels through knuckles at said respective axes perpendicular to the ground of said one pair of left and right wheels.

14. A four-wheel vehicle equipped with a turning mechanism according to claim 1, wherein said turn driving device includes a braking device for applying a braking force to rotations of said one pair of left and right wheels in response to a manipulation on a switch arranged in a steering wheel.

15. A four-wheel vehicle equipped with a turning mechanism according to claim 1, wherein said turn driving device includes a braking device for applying a braking force to rotations of said one pair of left and right wheels in response to stepping on a brake pedal.

16. A four-wheel vehicle equipped with a turning mechanism comprising:

a rotatably supporting device for supporting one of front and rear pairs of left and right wheels, to which a running torque produced by a driving source is not transmitted, for rotation concerning respective axes perpendicular to the ground;

an instructing device for generating a turn mode instruction in response to a manipulation;

a determining device for determining whether a vehicle operating state satisfies predetermined conditions when said turn mode instruction is generated;

a rotation driving device, when said determining device determines that said predetermined conditions are satisfied, for rotating the one pair of left and right wheels from straight traveling positions taken when said vehicle is running to respective angular positions along tangential directions of an arc passing said respective axes perpendicular to the ground of said one pair of left and right wheels, said arc having the center located near a center point of a rotating axle for running said vehicle of the other of the front and rear pairs of left and right wheels; and a turn driving device for applying rotating torques in rotating directions different from each other to the other pair of left and right wheels at angular positions along tangential directions to turn the vehicle body on a neighborhood of the center point of the rotating axle for running said vehicle of said other pair of left and right wheels.

17. A four-wheel vehicle equipped with a turning mechanism according to claim 16, wherein said turn driving device applies the rotating torques in rotating directions different from each other to the respective left and right wheels of said other pair with a driving source different from said driving source to turn the vehicle body.

18. A four-wheel vehicle equipped with a turning mechanism according to claim 16, wherein said turn driving device includes:

a device for fixing a case for rotatably supporting two pinions arranged in a differential during a turning operation of said vehicle body; and a motor for driving one of side gears arranged in said differential to rotate.

19. A four-wheel vehicle equipped with a turning mechanism comprising:

a rotatably supporting device for supporting one of front and rear pairs of left and right wheels, to which a running torque produced by a driving source is not transmitted, for rotation concerning respective axes perpendicular to the ground;

a rotation driving device for rotating the one pair of left and right wheels from straight traveling positions taken when said vehicle is running to respective angular positions along tangential directions of an arc passing said respective axes perpendicular to the ground of said one pair of left and right wheels, said arc having the center located near a center point of a rotating axle for running said vehicle of the other of the front and rear pairs of left and right wheels;

motors for applying rotating torques to said one pair of left and right wheels at the angular positions along said tangential directions to turn a vehicle body on a neighborhood of the center point of the rotating axle for running said vehicle of said other pair of left and right wheels;

a turn instructing device for generating a left or right turn instruction in response to a manipulation; and a voltage applying device for applying said motors with a gradually increasing driving voltage in response to said turn instruction.

20. A four-wheel vehicle equipped with a turning mechanism according to claim 19, wherein said voltage applying device gradually increases said driving voltage for a predetermined time, and thereafter maintains said driving voltage at a constant level.

21. A four-wheel vehicle equipped with a turning mechanism according to claim 19, wherein said motors rotate said one pair of left and right wheels in the counter-clockwise direction in response to said left turn signal to turn said vehicle body counterclockwise, and rotate said one pair of left and right wheels in the clockwise direction in response to said right turn signal to turn said vehicle body clockwise.

22. A four-wheel vehicle equipped with a turning mechanism according to claim 19, wherein said motors are provided for the respective left and right wheels of said one pair.

23. A four-wheel vehicle equipped with a turning mechanism according to claim 19, further including:
   a turn stop instructing device for generating a turn stop instruction in response to a manipulation; and
   a braking force applying device for applying said motors with a gradually increasing braking force in response to said turn stop instruction.

24. A four-wheel vehicle equipped with a turning mechanism according to claim 19, wherein said turn instructing device and said turn stop instructing device for generating a turn stop instruction are arranged integral with a steering wheel.

25. A four-wheel vehicle equipped with a turning mechanism comprising:
   a rotatably supporting device for supporting one of front and rear pairs of left and right wheels, to which a running torque produced by a driving source is not transmitted, for rotation concerning respective axes perpendicular to the ground;
   a rotation driving device for rotating the one pair of left and right wheels from straight traveling positions taken when said vehicle is running to respective angular positions along tangential directions of an arc passing said respective axes perpendicular to the ground of said one pair of left and right wheels, said arc having the center located near a center point of a rotating axle for running said vehicle of the other of the front and rear pairs of left and right wheels;
   motors for applying rotating torques to said one pair of left and right wheels at the angular positions along said tangential directions to turn a vehicle body on a neighborhood of the center point of the rotating axle for running said vehicle of the other pair of left and right wheels;
   a turn instructing device for generating a left or right turn instruction in response to a manipulation; and
   a voltage applying device for applying said motors with a driving voltage at a level corresponding to the amount of pressing force to an acceleration pedal during generation of said turn instruction.

26. A four-wheel vehicle equipped with a turning mechanism according to claim 25, further comprising a transmission formed with a left turn shift position and a right turn shift position in addition to shift positions for transmission,
   wherein said turn instructing device generates said left turn instruction when a shift lever of said transmission is moved to said left turn shift position, and generates said right turn instruction when the shift lever of said transmission is moved to said right turn shift position.

27. A four-wheel vehicle equipped with a turning mechanism according to claim 25, further comprising a braking force applying device for applying said motors with a braking force corresponding to the amount of pressing force to a brake pedal.

28. A four-wheel vehicle equipped with a turning mechanism according to claim 26, wherein said motors are applied with a slight driving force when neither said acceleration pedal nor said brake pedal is not stepped on.

* * * * *